(12) United States Patent
Anand et al.

(10) Patent No.: US 11,720,570 B2
(45) Date of Patent: Aug. 8, 2023

(54) AGGREGATION OPERATIONS IN A DISTRIBUTED DATABASE

(71) Applicant: ThoughtSpot, Inc., Sunnyvale, CA (US)

(72) Inventors: Ashok Anand, Bengaluru (IN); Ambareesh Sreekumaran Nair Jayakumari, Cupertino, CA (US); Prateek Gaur, San Jose, CA (US); Donko Donjerkovic, San Mateo, CA (US)

(73) Assignee: ThoughtSpot, Inc., Mountain View, CA (US)

( * ) Notice: Subject to any disclaimer, the term of this patent is extended or adjusted under 35 U.S.C. 154(b) by 210 days.

(21) Appl. No.: 17/214,247

(22) Filed: Mar. 26, 2021

(65) Prior Publication Data

US 2022/0309067 A1    Sep. 29, 2022

(51) Int. Cl.
*G06F 16/2455* (2019.01)
*G06F 16/27* (2019.01)
*G06F 16/22* (2019.01)
*G06F 16/248* (2019.01)

(52) U.S. Cl.
CPC .... *G06F 16/24556* (2019.01); *G06F 16/2282* (2019.01); *G06F 16/248* (2019.01); *G06F 16/27* (2019.01)

(58) Field of Classification Search
None
See application file for complete search history.

(56) References Cited

U.S. PATENT DOCUMENTS

| | | | | |
|---|---|---|---|---|
| 10,789,261 | B1* | 9/2020 | Nguyen | G06F 16/282 |
| 11,010,380 | B2* | 5/2021 | Purcell | G06F 16/24542 |
| 11,048,703 | B2* | 6/2021 | Purcell | G06F 16/24542 |
| 11,487,668 | B2* | 11/2022 | Anand | G06F 16/21 |
| 2020/0250163 | A1 | 8/2020 | Kuimelis et al. | |
| 2020/0409944 | A1* | 12/2020 | Nguyen | G06F 16/972 |
| 2021/0019315 | A1* | 1/2021 | Fender | G06F 16/2456 |
| 2022/0309067 | A1* | 9/2022 | Anand | G06F 16/2471 |
| 2022/0318147 | A1* | 10/2022 | Anand | G06F 16/9014 |

* cited by examiner

*Primary Examiner* — Kim T Nguyen
(74) *Attorney, Agent, or Firm* — Young Basile Hanlon & MacFarlane, P.C.

(57) ABSTRACT

Querying a distributed database including a table sharded into shards distributed to database instances includes receiving a data-query that includes an aggregation clause on a first column and a grouping clause on a second column; obtaining and outputting results data. Obtaining the results data includes receiving, by a query coordinator, intermediate results data; and combining, by the query coordinator, the intermediate results to obtain the results data. Receiving the intermediate results data includes receiving, from a first database instance, first aggregation values indicating, on a per-group basis in accordance with the grouping clause, a respective aggregation value of distinct values of the first column in accordance with the aggregation clause, and receiving, from a second database instance, second aggregation values indicating, on a per-group basis in accordance with the grouping clause, a respective aggregation value of distinct values of the first column in accordance with the aggregation clause.

20 Claims, 12 Drawing Sheets

AGGREGATION OPERATIONS IN A DISTRIBUTED DATABASE

BACKGROUND

Advances in computer storage and database technology have led to exponential growth of the amount of data being created. Businesses are overwhelmed by the volume of the data stored in their computer systems. Existing database analytic tools are inefficient, costly to utilize, and/or require substantial configuration and training.

SUMMARY

Disclosed herein are implementations of aggregation operations in a distributed database.

A first aspect is a method for querying a distributed database. The method includes receiving a data-query at the distributed database, where the distributed database includes a table, the table includes a first column and a second column, the table is partitioned into shards according to a sharding criterion, where the sharding criterion indicates the first column such that a first shard includes one or more rows of the table having a first value of the first column and a second shard omits a row of the table having the first value of the first column, the shards are distributed to database instances of the distributed database, and the data-query includes an aggregation clause on the first column and a grouping clause on the second column. The method also includes identifying a query coordinator for processing the data-query; obtaining results data responsive to the data-query; and outputting the results data. Obtaining the results data includes receiving, by the query coordinator and from at least a subset of the database instances of the distributed database, intermediate results data responsive to at least a portion of the data-query; and combining, by the query coordinator, the intermediate results to obtain the results data. Receiving the intermediate results data includes receiving, from a first database instance for a first shard, first aggregation values indicating, on a per-group basis in accordance with the grouping clause, a respective aggregation value of distinct values of the first column in accordance with the aggregation clause, and receiving, from a second database instance for a second shard, second aggregation values indicating, on a per-group basis in accordance with the grouping clause, a respective aggregation value of distinct values of the first column in accordance with the aggregation clause.

A second aspect is a method for query planning in a distributed database that includes a table that is partitioned into shards that are distributed to database instances of the distributed database. The method includes receiving a data-query at a query coordinator, where the data-query includes a first "distinct count" clause on a first column of the table and a "group by" clause on least a second column of the table, and where the table is partitioned into the shards according to a sharding criterion; formulating a query plan; executing the query plan to obtain results data; and outputting the results. The query plan includes respective instructions for converting, at at least some of the database instances, distinct values of the first column grouped by values of the second column into a count of the distinct values grouped by the values of the second column to obtain respective intermediate results; instructions for receiving, at the query coordinator, the respective intermediate results from at least a subset of the at least some of the database instances; and instructions for concatenating the respective intermediate results using a summing operation to obtain the "distinct count" of the first column grouped by the second column.

A third aspect is an apparatus for querying a distributed database. The apparatus includes a processor that configured is to extract, from a shard of a table of the distributed database, respective distinct values of a first column of the table for each value of a second column of the table, where the table is partitioned into shards according to a sharding criterion, and the shard includes values of the first column according to the sharding criterion such that the values of the first column according to the sharding criterion are not in any other shard of the shards; obtain an intermediate result by determining a respective number of the respective distinct values for the each value of the second column of the table; and transmit the intermediate result to a query coordinator.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 illustrates an example of a sharding agnostic aggregation operation.

FIG. 7A illustrates an example of data partitioning according to an aggregation column of a data-query for aggregations together with groupings of data in a distributed database according to implementations of this disclosure.

DETAILED DESCRIPTION

Figure 1:
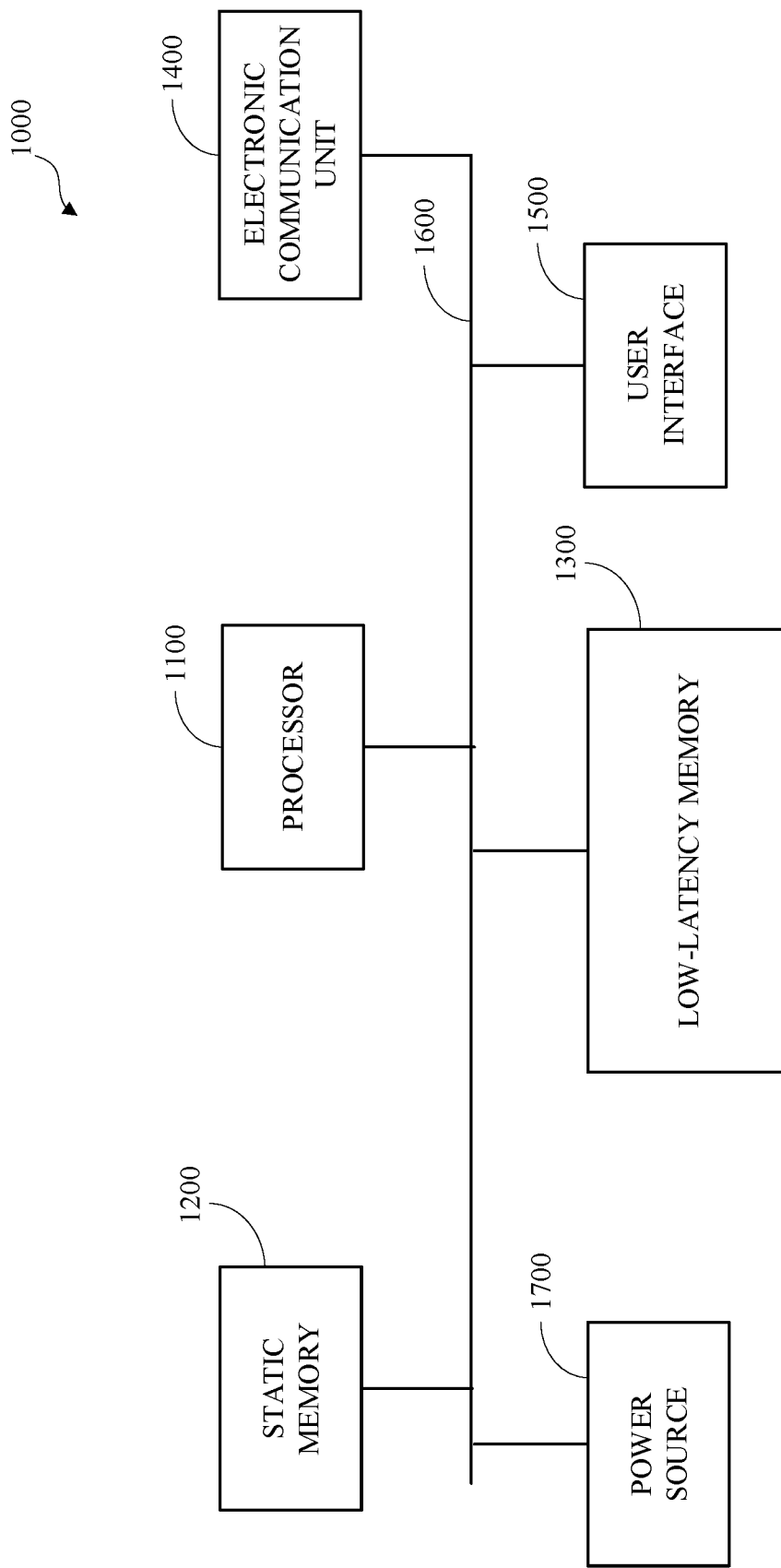
FIG. 1 is a block diagram of an example of a computing device.

Businesses and other organizations store large amounts of data, such as business records, transaction records, and the like, in data storage systems, such as relational database systems that store data as records, or rows, having values, or fields, corresponding to respective columns in tables that can be interrelated using key values. The utility of individual record and tables may be limited without substantial correlation, interpretation, and analysis. The complexity of these data structures and the large volumes of data that can be stored therein limit the accessibility of the data and require substantial skilled human resources to code procedures and tools that allow business users to access useful data. The tools that are available for accessing these systems are limited to outputting data expressly requested by the users and lack the capability to identify and prioritize data other than the data expressly requested. Useful data, such as data aggregations, patterns, and statistical anomalies that would not be available in smaller data sets (e.g., 10,000 rows of data), and may not be apparent, may be derivable using the large volume of data (e.g., millions or billions of rows) stored in complex data storage systems, such as relational database systems, and may be inaccessible due to the complexity and limitations of the data storage systems.

In a distributed database, such as a distributed in-memory database as described herein, a table may be partitioned into shards. The data of the sharded table can be low-latency data as described herein. Sharding a table includes distributing the data (e.g., rows) of the sharded table amongst the shards in such a way that a row of the sharded table is included in a shard and is omitted from the other shards. Sharding a table may include distributing the rows of the table amongst the shards according to sharding criteria. Sharding a table may include distributing the rows of the table to respective shards based on the value in the row for a column identified by the sharding criteria. For examples, rows of a sharded table having a first value for the column identified by the sharding criteria may be included in a first shard and omitted from a second shard and rows of the sharded table having a second value for the column may be included in the second shard and omitted from the first shard.

The sharding criteria can be derived from one or more columns of the table. The sharding criteria can be derived from one column of the sharded table, can use more than one column of the table, or can be some other criteria. The sharding criteria may be used to distribute rows of the table amongst the available shards. This may include arranging the distribution of the rows in a manner such that rows with the same sharding criteria value(s) are placed in the same shard where feasible based on the number of shards and the variation in the number of rows per shard that is desired. In some implementations, all the rows of the table that have the same sharding criteria value(s) may be stored in only one of the shards. A shard can include more than one value of the sharding criteria.

A table can be sharded into tens, hundreds, or more shards. A shard can include, for example, one row or millions of rows of data. The shards can be distributed to database instances of the distributed database, such as the in-memory database instances described herein. In an example, the number of shards can be a multiple of the number of database instances. As such, more than one shard can be distributed to a database instance. The database instances may be implemented on various different computing devices. Some database instances may be implemented on the same computing device.

Sharding can improve data-query performance. For example, a received data-query may be routed to a subset of the database instances for processing. The subset of the database instances may be determined based on the data-query criteria and the sharding criteria. As such, less data of the sharded table can be evaluated (e.g., considered, looked through, queried, tested, retrieved, etc.) and processing can be spread out amongst more computing devices with, e.g., greater collective processing and memory capabilities. Sharding can also improve query parallelism by having multiple database instances executing a data-query in parallel such that each database instance considers a subset of the data of the sharded table.

A data-query, as described herein, can be executed (e.g., processed, etc.) by the distributed database of obtain results data. In an example, the results data may be, or may be further processed to be, output, such as to for display. The data-query may be executed in response to an explicit or an implicit request for the results data, such as a request for data. The request for data can be a request for an insight object, a request for a pinboard object, data expressing a usage intent, and the like, as described herein. A data-query, or a portion thereof, may be an expression of a request for data that includes aggregating and grouping the data.

To illustrate, data expressing a usage intent, such as data representing user input, can be resolved and transformed, or otherwise processed, to obtain a data-query. A data-query may be a representation of the data expressing the usage intent, or a portion thereof, expressed in accordance with a defined structured query language, such as the defined structured query language of the distributed database. In response to data expressing a usage intent, a data-query may be obtained indicating aggregations together with groupings. The data expressing a usage intent may be, for example, "unique count of A by B." That is, the data-query may indicate grouping data based on values of a first column and aggregating the data based on a second column. These data expressing a usage intent may be resolved to a defined structured query language implemented by the distributed database, and which may be expressed in pseudo-code as "select count (distinct A) from T group by B," where A and B are columns of the table T, the column B is referred to as a grouping column, and the column A is referred to as an aggregation column.

Execution of a data-query may include grouping the data in accordance with a grouping clause. A grouping clause indicates that execution of the data-query includes grouping the data based on values of an identified column (e.g., the grouping column). For example, the grouping clause may be expressed as "group by B" indicating that rows of a table T may be grouped based on the respective values of column B, where column B is a column of a table T. Execution of a data-query may include aggregating the data in accordance with an aggregation clause. An aggregation clause indicates that execution of the data-query includes aggregating at least a portion of the data based on values of an identified column (e.g., the aggregation column). For example, the aggregation clause may be expressed as "distinct count A" indicating that an aggregation of values of column A from rows of table T may be determined, wherein column A is a column of a table T. Execution of a data-query may include a combination of grouping and aggregating based on a grouping clause and an aggregation clause. For example, in the combination of a grouping clause and an aggregation clause that is expressed as "distinct count A group by B," distinct values of column A may be aggregated (e.g., counted) on a per-group basis of the column B.

Figure 4:
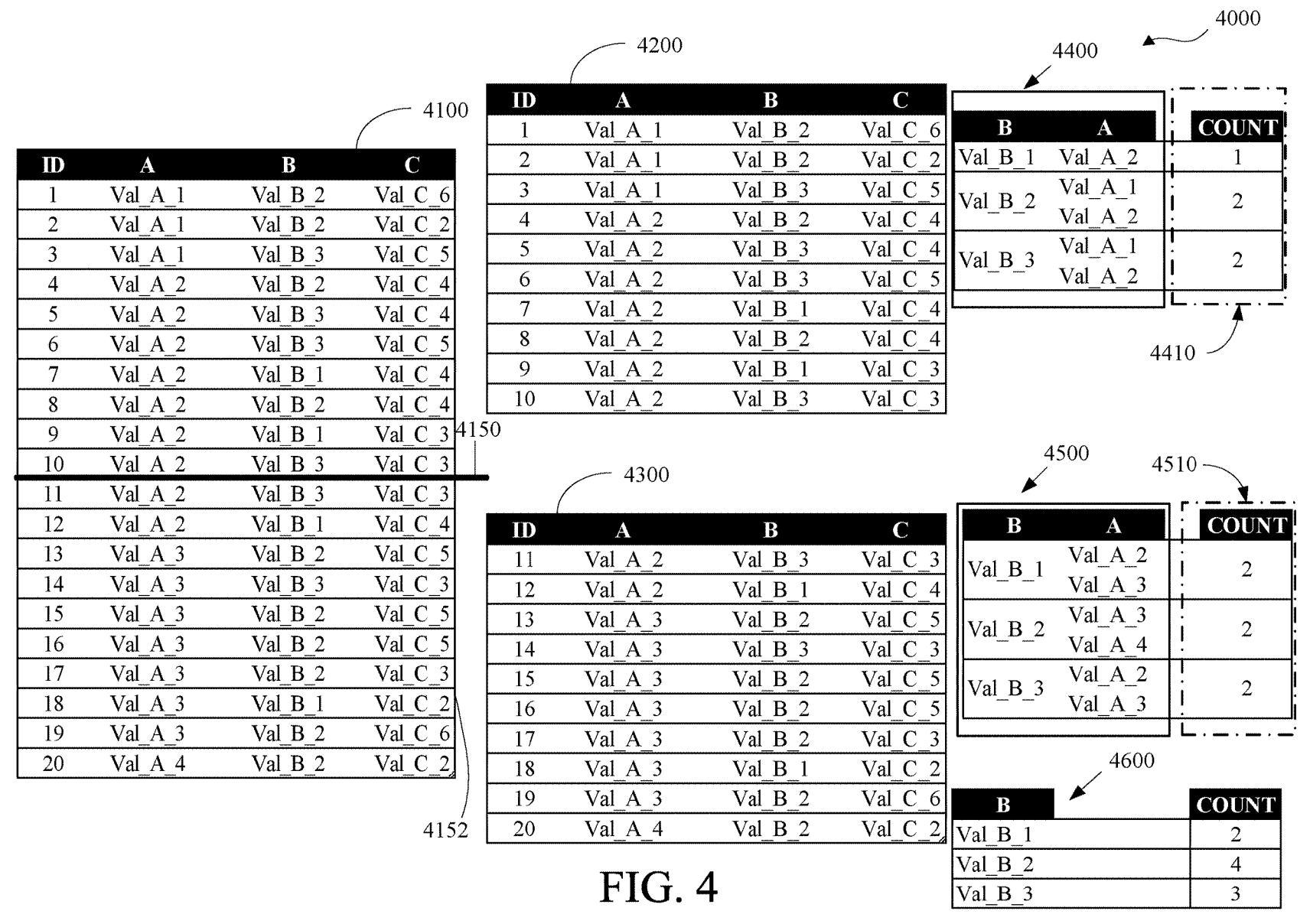

As further described with respect to FIG. 4, executing a data-query that includes aggregations together with groupings of data on a sharded table may include obtaining intermediate results, such as on a per-shard basis, wherein the intermediate results obtained from a shard may include unique values of the aggregation column on a per-group basis wherein the groups are determined based on the corresponding values of the grouping column; transmitting the intermediate results including the unique values of the aggregation column to a query coordinator; and combining (e.g., unioning) the per-shard intermediate results at the query coordinator to remove duplicates. This may be performed because the various shards may have the same value in the column to which the distinct count is being applied and thus if the distinct count is performed on each shard and is then summed together, certain values may be double-counted as unique values. In other words, the unique count will have been performed based on the count of unique values per shard instead of the count of unique values for the query as a whole across the entire data set.

Execution of a data-query that includes transmitting and combining the intermediate results including the unique values may include relatively high resource utilization degrading the performance of the distributed database and the low-latency data analysis system and may cause some operations to fail due to resource exhaustion. The possibility for degraded performance and increased usage of the database instance coordinating the query across shards may also include substantially increased investment in processing, memory, and storage resources for that coordinating database instance and may also result in increased energy expenditures (needed to operate those increased processing, memory, and storage resources, and for the network transmission of the intermediate data) and associated emissions that may result from the generation of that energy.

By leveraging sharding criteria, implementations according to this disclosure can optimize data-queries for aggregations together with groupings. When the sharding criteria include at least the aggregation column (e.g., the column A of the above data-query), the aggregation operation (e.g., counting or determining the cardinality of the distinct values) of the aggregation column can be performed at each database instance and the counts (e.g., cardinalities) can be transferred to the query coordinator. The query coordinator can then summarize (e.g., sum) the received aggregations (e.g., counts, cardinalities) to obtain the results data.

Implementations including aggregation operations in a distributed database, as described herein, may reduce memory and network utilization and result in faster execution of data-queries. Aggregation operations in a distributed database may include receiving a data-query that includes an aggregation clause on a first column and a grouping clause on a second column of a table of a distributed database, where the table is sharded on at least the first column; obtaining intermediate results data from database instances, where an intermediate result received from a database instance for a shard includes a respective aggregate value of the first column for each value of second column available in the shard; and combining the intermediate results by aggregating the respective aggregate values from each intermediate result.

As such, the transfer of the unique values of the grouping column from each database instance can be avoided; the aggregation operation can be pushed down to the database instance on which the shard is stored such that each database instance aggregates a subset of the data; and the union operation can be eliminated and replaced by a simpler operation (e.g., a sum operation of the separate unique counts for each shard).

Experiments have shown that data-query execution time, memory footprint, and network traffic can be significantly reduced when data-queries for aggregations together with groupings are optimized as described herein. The network traffic can be reduced since database instances need not transmit the unique values of the aggregation column that is included in the sharding criteria.

In a comparative example, a data-query on a sharded table was executed using sharding-agnostic data-query execution and using data-queries for aggregations together with groupings. The table is sharded into three regions (i.e., shards) where one of the shards is distributed to a database instance that is also the query coordinator. The data-query includes aggregation clauses on a first, a second, and a third column of the sharded table, and includes a grouping clause on a fourth column of the table. The table includes 338 million rows and is sharded on the third column. The first column has a total of 131 unique values, the second column has a total of 15 unique values, the third column has a total of 335 million unique values, and the fourth column (i.e., the grouping column) has a total of 491 unique values. When the data-query was executed using the sharding-agnostic data-query execution, the query executed in 95 seconds, used 35 GB of memory across database instances, and resulted in a transfer of 5 GB of data over the network from the other two database instances to the query coordinator. Contrastingly, when data-queries for aggregations together with groupings as described herein was used, the data-query executed in 9 seconds, used 4 GB of memory across database instances, and resulted in a transfer of 341 KB of data over the network from the other two database instances to the query coordinator.

FIG. 1 is a block diagram of an example of a computing device 1000. One or more aspects of this disclosure may be implemented using the computing device 1000. The computing device 1000 includes a processor 1100, static memory 1200, low-latency memory 1300, an electronic communication unit 1400, a user interface 1500, a bus 1600, and a power source 1700. Although shown as a single unit, any one or more element of the computing device 1000 may be integrated into any number of separate physical units. For example, the low-latency memory 1300 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may include a cache, or cache memory, for internal storage of operating data or instructions. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the static memory 1200, the low-latency memory 1300, the electronic communication unit 1400, the user interface 1500, the bus 1600, the power source 1700, or any combination thereof. The processor may execute, which may include controlling, such as by sending electronic signals to, receiving electronic signals from, or both, the static memory 1200, the low-latency memory 1300, the electronic communication unit 1400, the user interface 1500, the bus 1600, the power source 1700, or any combination thereof to execute, instructions, programs, code, applications, or the like, which may include executing one or more aspects of an operating system, and which may include executing one or more instructions to perform one or more aspects described herein, alone or in combination with one or more other processors.

The static memory 1200 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the static memory 1200 may be implemented as multiple logical or physical units.

The static memory 1200 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1300 is coupled to the processor 1100 via the bus 1600 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 1300 may be implemented as multiple logical or physical units. Other configurations may be used. For example, low-latency memory 1300, or a portion thereof, and processor 1100 may be combined, such as by using a system on a chip design.

The low-latency memory 1300 may store executable instructions or data, such as application data for low-latency access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The low-latency memory 1300 may be used to store data that is analyzed or processed using the systems or methods described herein. For example, storage of some or all data in low-latency memory 1300 instead of static memory 1200 may improve the execution speed of the systems and methods described herein by permitting access to data more quickly by an order of magnitude or greater (e.g., nanoseconds instead of microseconds).

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE), or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active matrix organic light emitting diode (AMO-LED), or other suitable display. In some implementations, the user interface 1500, or a portion thereof, may be part of another computing device (not shown). For example, a physical user interface, or a portion thereof, may be omitted from the computing device 1000 and a remote or virtual interface may be used, such as via the electronic communication unit 1400.

The bus 1600 is coupled to the static memory 1200, the low-latency memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickelcadmium (NiCad), nickel-zinc (NiZn), nickel metal hydride (NiMH), lithium-ion (Li-ion); solar cells; fuel cells; or any other device capable of powering the computing device 1000.

Figure 2:
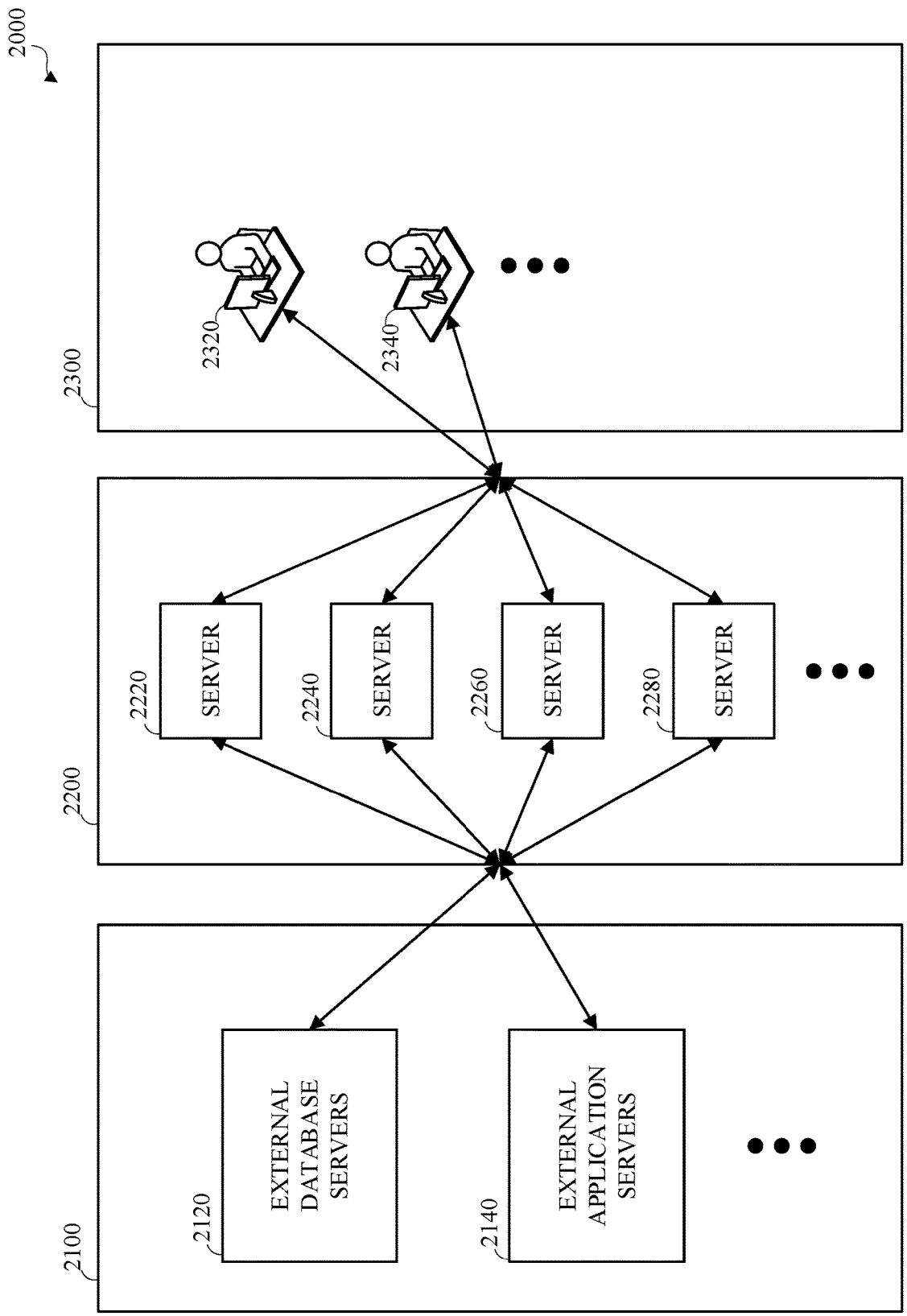
FIG. 2 is a block diagram of an example of a computing system.

FIG. 2 is a block diagram of an example of a computing system 2000. As shown, the computing system 2000 includes an external data source portion 2100, an internal database analysis portion 2200, and a system interface portion 2300. The computing system 2000 may include other elements not shown in FIG. 2, such as computer network elements.

The external data source portion 2100 may be associated with, such as controlled by, an external person, entity, or organization (second-party). The internal database analysis portion 2200 may be associated with, such as created by or controlled by, a person, entity, or organization (first-party). The system interface portion 2300 may be associated with, such as created by or controlled by, the first-party and may be accessed by the first-party, the second-party, third-parties, or a combination thereof, such as in accordance with access and authorization permissions and procedures.

The external data source portion 2100 is shown as including external database servers 2120 and external application servers 2140. The external data source portion 2100 may include other elements not shown in FIG. 2. The external data source portion 2100 may include external computing devices, such as the computing device 1000 shown in FIG. 1, which may be used by or accessible to the external person, entity, or organization (second-party) associated with the external data source portion 2100, including but not limited to external database servers 2120 and external application servers 2140. The external computing devices may include data regarding the operation of the external person, entity, or organization (second-party) associated with the external data source portion 2100.

The external database servers 2120 may be one or more computing devices configured to store data in a format and schema determined externally from the internal database analysis portion 2200, such as by a second-party associated with the external data source portion 2100, or a third party. For example, the external database server 2120 may use a relational database and may include a database catalog with a schema. In some embodiments, the external database server 2120 may include a non-database data storage structure, such as a text-based data structure, such as a comma separated variable structure or an extensible markup language formatted structure or file. For example, the external database servers 2120 can include data regarding the production of materials by the external person, entity, or organization (second-party) associated with the external data source portion 2100, communications between the external person, entity, or organization (second-party) associated with the external data source portion 2100 and third parties, or a combination thereof. Other data may be included. The external database may be a structured database system, such as a relational database operating in a relational database management system (RDBMS), which may be an enterprise database. In some embodiments, the external database may be an unstructured data source. The external data may include data or content, such as sales data, revenue data, profit data, tax data, shipping data, safety data, sports data, health data, weather data, or the like, or any other data, or combination of data, that may be generated by or associated with a user, an organization, or an enterprise and stored in a database system. For simplicity and clarity, data stored in or received from the external data source portion 2100 may be referred to herein as enterprise data.

The external application server 2140 may include application software, such as application software used by the external person, entity, or organization (second-party) associated with the external data source portion 2100. The external application server 2140 may include data or metadata relating to the application software.

The external database servers 2120, the external application servers 2140, or both, shown in FIG. 2 may represent logical units or devices that may be implemented on one or more physical units or devices, which may be controlled or operated by the first party, the second party, or a third party.

The external data source portion 2100, or aspects thereof, such as the external database servers 2120, the external application servers 2140, or both, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

The internal database analysis portion 2200 is shown as including servers 2220, 2240, 2260, and 2280. The servers 2220, 2240, 2260, and 2280 may be computing devices, such as the computing device 1000 shown in FIG. 1. Although four servers 2220, 2240, 2260, and 2280 are shown in FIG. 2, other numbers, or cardinalities, of servers may be used. For example, the number of computing devices may be determined based on the capability of individual computing devices, the amount of data to be processed, the complexity of the data to be processed, or a combination thereof. Other metrics may be used for determining the number of computing devices.

The internal database analysis portion 2200 may store data, process data, or store and process data. The internal database analysis portion 2200 may include a distributed cluster (not expressly shown) which may include two or more of the servers 2220, 2240, 2260, and 2280. The operation of distributed cluster, such as the operation of the servers 2220, 2240, 2260, and 2280 individually, in combination, or both, may be managed by a distributed cluster manager. For example, the server 2220 may be the distributed cluster manager. In another example, the distributed cluster manager may be implemented on another computing device (not shown). The data and processing of the distributed cluster may be distributed among the servers 2220, 2240, 2260, and 2280, such as by the distributed cluster manager.

Enterprise data from the external data source portion 2100, such as from the external database server 2120, the external application server 2140, or both may be imported into the internal database analysis portion 2200. The external database server 2120, the external application server 2140, or both may be one or more computing devices and may communicate with the internal database analysis portion 2200 via electronic communication. The imported data may be distributed among, processed by, stored on, or a combination thereof, one or more of the servers 2220, 2240, 2260, and 2280. Importing the enterprise data may include importing or accessing the data structures of the enterprise data. Importing the enterprise data may include generating internal data, internal data structures, or both, based on the enterprise data. The internal data, internal data structures, or both may accurately represent and may differ from the enterprise data, the data structures of the enterprise data, or both. In some implementations, enterprise data from multiple external data sources may be imported into the internal database analysis portion 2200. For simplicity and clarity, data stored or used in the internal database analysis portion 2200 may be referred to herein as internal data. For example, the internal data, or a portion thereof, may represent, and may be distinct from, enterprise data imported into or accessed by the internal database analysis portion 2200.

The system interface portion 2300 may include one or more client devices 2320, 2340. The client devices 2320, 2340 may be computing devices, such as the computing device 1000 shown in FIG. 1. For example, one of the client devices 2320, 2340 may be a desktop or laptop computer and the other of the client devices 2320, 2340 may be a mobile device, smartphone, or tablet. One or more of the client devices 2320, 2340 may access the internal database analysis portion 2200. For example, the internal database analysis portion 2200 may provide one or more services, application interfaces, or other electronic computer communication interfaces, such as a web site, and the client devices 2320, 2340 may access the interfaces provided by the internal database analysis portion 2200, which may include accessing the internal data stored in the internal database analysis portion 2200.

In an example, one or more of the client devices 2320, 2340 may send a message or signal indicating a request for data, which may include a request for data analysis, to the internal database analysis portion 2200. The internal database analysis portion 2200 may receive and process the request, which may include distributing the processing among one or more of the servers 2220, 2240, 2260, and 2280, may generate a response to the request, which may include generating or modifying internal data, internal data structures, or both, and may output the response to the client device 2320, 2340 that sent the request. Processing the request may include accessing one or more internal data indexes, an internal database, or a combination thereof. The client device 2320, 2340 may receive the response, including the response data or a portion thereof, and may store, output, or both, the response or a representation thereof, such as a representation of the response data, or a portion thereof, which may include presenting the representation via a user interface on a presentation device of the client device 2320, 2340, such as to a user of the client device 2320, 2340.

The system interface portion 2300, or aspects thereof, such as one or more of the client devices 2320, 2340, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

Figure 3:
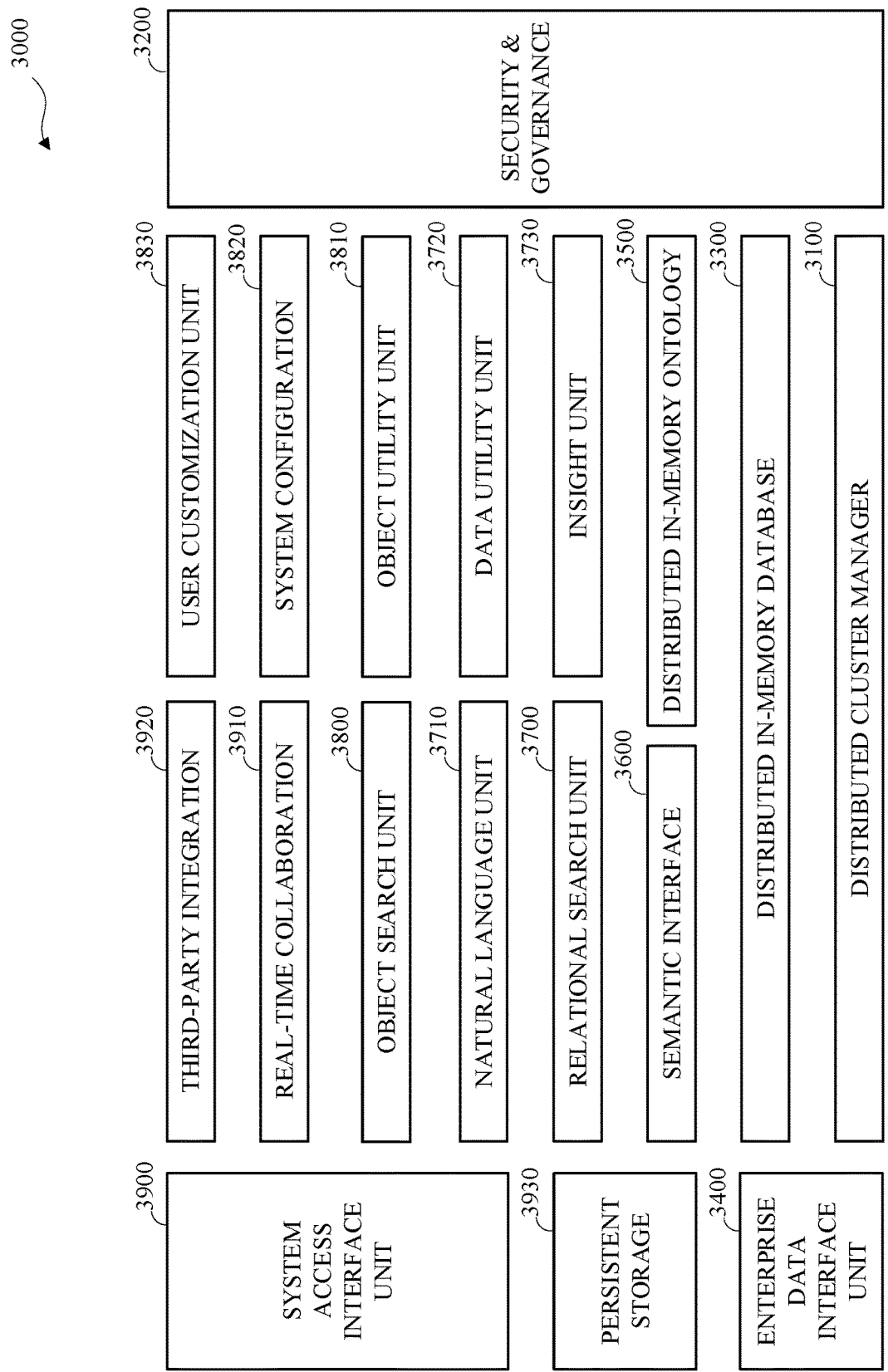
FIG. 3 is a block diagram of an example of a low-latency database analysis system.

FIG. 3 is a block diagram of an example of a low-latency database analysis system 3000. The low-latency database analysis system 3000, or aspects thereof, may be similar to the internal database analysis portion 2200 shown in FIG. 2, except as described herein or otherwise clear from context. The low-latency database analysis system 3000, or aspects thereof, may be implemented on one or more computing devices, such as servers 2220, 2240, 2260, and 2280 shown in FIG. 2, which may be in a clustered or distributed computing configuration.

The low-latency database analysis system 3000 may store and maintain the internal data, or a portion thereof, such as low-latency data, in a low-latency memory device, such as the low-latency memory 1300 shown in FIG. 1, or any other type of data storage medium or combination of data storage devices with relatively fast (low-latency) data access, organized in a low-latency data structure. In some embodiments, the low-latency database analysis system 3000 may be implemented as one or more logical devices in a cloud-based configuration optimized for automatic database analysis.

As shown, the low-latency database analysis system 3000 includes a distributed cluster manager 3100, a security and governance unit 3200, a distributed in-memory database 3300, an enterprise data interface unit 3400, a distributed in-memory ontology unit 3500, a semantic interface unit 3600, a relational search unit 3700, a natural language processing unit 3710, a data utility unit 3720, an insight unit 3730, an object search unit 3800, an object utility unit 3810, a system configuration unit 3820, a user customization unit 3830, a system access interface unit 3900, a real-time collaboration unit 3910, a third-party integration unit 3920, and a persistent storage unit 3930, which may be collectively referred to as the components of the low-latency database analysis system 3000.

Although not expressly shown in FIG. 3, one or more of the components of the low-latency database analysis system 3000 may be implemented on one or more operatively connected physical or logical computing devices, such as in a distributed cluster computing configuration, such as the internal database analysis portion 2200 shown in FIG. 2. Although shown separately in FIG. 3, one or more of the components of the low-latency database analysis system 3000, or respective aspects thereof, may be combined or otherwise organized.

The low-latency database analysis system 3000 may include different, fewer, or additional components not shown in FIG. 3. The aspects or components implemented in an instance of the low-latency database analysis system 3000 may be configurable. For example, the insight unit 3730 may be omitted or disabled. One or more of the components of the low-latency database analysis system 3000 may be implemented in a manner such that aspects thereof are divided or combined into various executable modules or libraries in a manner which may differ from that described herein.

The low-latency database analysis system 3000 may implement an application programming interface (API), which may monitor, receive, or both, input signals or messages from external devices and systems, client systems, process received signals or messages, transmit corresponding signals or messages to one or more of the components of the low-latency database analysis system 3000, and output, such as transmit or send, output messages or signals to respective external devices or systems. The low-latency database analysis system 3000 may be implemented in a distributed computing configuration.

The distributed cluster manager 3100 manages the operative configuration of the low-latency database analysis system 3000. Managing the operative configuration of the low-latency database analysis system 3000 may include controlling the implementation of and distribution of processing and storage across one or more logical devices operating on one or more physical devices, such as the servers 2220, 2240, 2260, and 2280 shown in FIG. 2. The distributed cluster manager 3100 may generate and maintain configuration data for the low-latency database analysis system 3000, such as in one or more tables, identifying the operative configuration of the low-latency database analysis system 3000. For example, the distributed cluster manager 3100 may automatically update the low-latency database analysis system configuration data in response to an operative configuration event, such as a change in availability or performance for a physical or logical unit of the low-latency database analysis system 3000. One or more of the component units of low-latency database analysis system 3000 may access the database analysis system configuration data, such as to identify intercommunication parameters or paths.

The security and governance unit 3200 may describe, implement, enforce, or a combination thereof, rules and procedures for controlling access to aspects of the low-latency database analysis system 3000, such as the internal data of the low-latency database analysis system 3000 and the features and interfaces of the low-latency database analysis system 3000. The security and governance unit 3200 may apply security at an ontological level to control or limit access to the internal data of the low-latency database analysis system 3000, such as to columns, tables, rows, or fields, which may include using row level security.

Although shown as a single unit in FIG. 3, the distributed in-memory database 3300 may be implemented in a distributed configuration, such as distributed among the servers 2220, 2240, 2260, and 2280 shown in FIG. 2, which may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The distributed in-memory database 3300 may generate, maintain, or both, a low-latency data structure and data stored or maintained therein (low-latency data). The low-latency data may include principal data, which may represent enterprise data, such as enterprise data imported from an external enterprise data source, such as the external data source portion 2100 shown in FIG. 2. In some implementations, the distributed in-memory database 3300 may include system internal data representing one or more aspects, features, or configurations of the low-latency database analysis system 3000. The distributed in-memory database 3300 and the low-latency data stored therein, or a portion thereof, may be accessed using commands, messages, or signals in accordance with a defined structured query language associated with the distributed in-memory database 3300.

The low-latency data, or a portion thereof, may be organized as tables in the distributed in-memory database 3300. A table may be a data structure to organize or group the data or a portion thereof, such as related or similar data. A table may have a defined structure. For example, each table may define or describe a respective set of one or more columns.

A column may define or describe the characteristics of a discrete aspect of the data in the table. For example, the definition or description of a column may include an identifier, such as a name, for the column within the table, and one or more constraints, such as a data type, for the data corresponding to the column in the table. The definition or description of a column may include other information, such as a description of the column. The data in a table may be accessible or partitionable on a per-column basis. The set of tables, including the column definitions therein, and information describing relationships between elements, such as tables and columns, of the database may be defined or described by a database schema or design. The cardinality of columns of a table, and the definition and organization of the columns, may be defined by the database schema or design. Adding, deleting, or modifying a table, a column, the definition thereof, or a relationship or constraint thereon, may be a modification of the database design, schema, model, or structure.

The low-latency data, or a portion thereof, may be stored in the database as one or more rows or records in respective tables. Each record or row of a table may include a respective field or cell corresponding to each column of the table. A field may store a discrete data value. The cardinality of rows of a table, and the values stored therein, may be variable based on the data. Adding, deleting, or modifying rows, or the data stored therein may omit modification of the database design, schema, or structure. The data stored in respective columns may be identified or defined as a measure data, attribute data, or enterprise ontology data (e.g., metadata).

Measure data, or measure values, may include quantifiable or additive numeric values, such as integer or floating-point values, which may include numeric values indicating sizes, amounts, degrees, or the like. A column defined as representing measure values may be referred to herein as a measure or fact. A measure may be a property on which quantitative operations (e.g., sum, count, average, minimum, maximum) may be performed to calculate or determine a result or output.

Attribute data, or attribute values, may include non-quantifiable values, such as text or image data, which may indicate names and descriptions, quantifiable values designated, defined, or identified as attribute data, such as numeric unit identifiers, or a combination thereof. A column defined as including attribute values may be referred to herein as an attribute or dimension. For example, attributes may include text, identifiers, timestamps, or the like.

Enterprise ontology data may include data that defines or describes one or more aspects of the database, such as data that describes one or more aspects of the attributes, measures, rows, columns, tables, relationships, or other aspects of the data or database schema. For example, a portion of the database design, model, or schema may be represented as enterprise ontology data in one or more tables in the database.

Distinctly identifiable data in the low-latency data may be referred to herein as a data portion. For example, the low-latency data stored in the distributed in-memory database 3300 may be referred to herein as a data portion, a table from the low-latency data may be referred to herein as a data portion, a column from the low-latency data may be referred to herein as a data portion, a row or record from the low-latency data may be referred to herein as a data portion, a value from the low-latency data may be referred to herein as a data portion, a relationship defined in the low-latency data may be referred to herein as a data portion, enterprise ontology data describing the low-latency data may be referred to herein as a data portion, or any other distinctly identifiable data, or combination thereof, from the low-latency data may be referred to herein as a data portion.

The distributed in-memory database 3300 may create or add one or more data portions, such as a table, may read from or access one or more data portions, may update or modify one or more data portions, may remove or delete one or more data portions, or a combination thereof. Adding, modifying, or removing data portions may include changes to the data model of the low-latency data. Changing the data model of the low-latency data may include notifying one or more other components of the low-latency database analysis system 3000, such as by sending, or otherwise making available, a message or signal indicating the change. For example, the distributed in-memory database 3300 may create or add a table to the low-latency data and may transmit or send a message or signal indicating the change to the semantic interface unit 3600.

In some implementations, a portion of the low-latency data may represent a data model of an external enterprise database and may omit the data stored in the external enterprise database, or a portion thereof. For example, prioritized data may be cached in the distributed in-memory database 3300 and the other data may be omitted from storage in the distributed in-memory database 3300, which may be stored in the external enterprise database. In some implementations, requesting data from the distributed in-memory database 3300 may include requesting the data, or a portion thereof, from the external enterprise database.

The distributed in-memory database 3300 may receive one or more messages or signals indicating respective data-queries for the low-latency data, or a portion thereof, which may include data-queries for modified, generated, or aggregated data generated based on the low-latency data, or a portion thereof. For example, the distributed in-memory database 3300 may receive a data-query from the semantic interface unit 3600, such as in accordance with a request for data. The data-queries received by the distributed in-memory database 3300 may be agnostic to the distributed configuration of the distributed in-memory database 3300. A data-query, or a portion thereof, may be expressed in accordance with the defined structured query language implemented by the distributed in-memory database 3300. In some implementations, a data-query may be included, such as stored or communicated, in a data-query data structure or container.

The distributed in-memory database 3300 may execute or perform one or more queries to generate or obtain response data responsive to the data-query based on the low-latency data.

The distributed in-memory database 3300 may interpret, evaluate, or otherwise process a data-query to generate one or more distributed-queries, which may be expressed in accordance with the defined structured query language. For example, an in-memory database instance of the distributed in-memory database 3300 may be identified as a query coordinator. The query coordinator may generate a query plan, which may include generating one or more distributed-queries, based on the received data-query. The query plan may include query execution instructions for executing one or more queries, or one or more portions thereof, based on the received data-query by the one or more of the in-memory database instances. Generating the query plan may include optimizing the query plan. The query coordinator may distribute, or otherwise make available, the respective portions of the query plan, as query execution instructions, to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The distributed in-memory database 3300 may output, or otherwise make available, the results data to the semantic interface unit 3600.

The enterprise data interface unit 3400 may interface with, or communicate with, an external enterprise data system. For example, the enterprise data interface unit 3400 may receive or access enterprise data from or in an external system, such as an external database. The enterprise data interface unit 3400 may import, evaluate, or otherwise process the enterprise data to populate, create, or modify data stored in the low-latency database analysis system 3000. The enterprise data interface unit 3400 may receive, or otherwise access, the enterprise data from one or more external data sources, such as the external data source portion 2100 shown in FIG. 2, and may represent the enterprise data in the low-latency database analysis system 3000 by importing, loading, or populating the enterprise data as principal data in the distributed in-memory database 3300, such as in one or more low-latency data structures. The enterprise data interface unit 3400 may implement one or more data connectors, which may transfer data between, for example, the external data source and the distributed in-memory database 3300, which may include altering, formatting, evaluating, or manipulating the data.

The enterprise data interface unit 3400 may receive, access, or generate metadata that identifies one or more parameters or relationships for the principal data, such as based on the enterprise data, and may include the generated metadata in the low-latency data stored in the distributed in-memory database 3300. For example, the enterprise data interface unit 3400 may identify characteristics of the principal data such as, attributes, measures, values, unique identifiers, tags, links, keys, or the like, and may include metadata representing the identified characteristics in the low-latency data stored in the distributed in-memory database 3300. The characteristics of the data can be automatically determined by receiving, accessing, processing, evaluating, or interpreting the schema in which the enterprise data is stored, which may include automatically identifying links or relationships between columns, classifying columns (e.g., using column names), and analyzing or evaluating the data.

Distinctly identifiable operative data units or structures representing one or more data portions, one or more entities, users, groups, or organizations represented in the internal data, or one or more aggregations, collections, relations, analytical results, visualizations, or groupings thereof, may be represented in the low-latency database analysis system 3000 as objects. An object may include a unique identifier for the object, such as a fully qualified name. An object may include a name, such as a displayable value, for the object.

For example, an object may represent a user, a group, an entity, an organization, a privilege, a role, a table, a column, a data relationship, a worksheet, a view, a context, an answer, an insight, a pinboard, a tag, a comment, a trigger, a defined variable, a data source, an object-level security rule, a row-level security rule, or any other data capable of being distinctly identified and stored or otherwise obtained in the low-latency database analysis system 3000. An object may represent or correspond with a logical entity. Data describing an object may include data operatively or uniquely identifying data corresponding to, or represented by, the object in the low-latency database analysis system. For example, a column in a table in a database in the low-latency database analysis system may be represented in the low-latency database analysis system as an object and the data describing or defining the object may include data operatively or uniquely identifying the column.

A worksheet (worksheet object), or worksheet table, may be a logical table, or a definition thereof, which may be a collection, a sub-set (such as a subset of columns from one or more tables), or both, of data from one or more data sources, such as columns in one or more tables, such as in the distributed in-memory database 3300. A worksheet, or a definition thereof, may include one or more data organization or manipulation definitions, such as join paths or worksheet-column definitions, which may be user defined. A worksheet may be a data structure that may contain one or more rules or definitions that may define or describe how a respective tabular set of data may be obtained, which may include defining one or more sources of data, such as one or more columns from the distributed in-memory database 3300. A worksheet may be a data source. For example, a worksheet may include references to one or more data sources, such as columns in one or more tables, such as in the distributed in-memory database 3300, and a request for data referencing the worksheet may access the data from the data sources referenced in the worksheet. In some implementations, a worksheet may omit aggregations of the data from the data sources referenced in the worksheet.

An answer (answer object), or report, may be a defined, such as previously generated, request for data, such as a resolved-request. An answer may include information describing a visualization of data responsive to the request for data.

A visualization (visualization object) may be a defined representation or expression of data, such as a visual representation of the data, for presentation to a user or human observer, such as via a user interface. Although described as a visual representation, in some implementations, a visualization may include non-visual aspects, such as auditory or haptic presentation aspects. A visualization may be generated to represent a defined set of data in accordance with a defined visualization type or template (visualization template object), such as in a chart, graph, or tabular form. Example visualization types may include, and are not limited to, chloropleths, cartograms, dot distribution maps, proportional symbol maps, contour/isopleth/isarithmic maps, daysymetric map, self-organizing map, timeline, time series, connected scatter plots, Gantt charts, steam graph/theme river, arc diagrams, polar area/rose/circumplex charts, Sankey diagrams, alluvial diagrams, pie charts, histograms, tag clouds, bubble charts, bubble clouds, bar charts, radial bar charts, tree maps, scatter plots, line charts, step charts, area charts, stacked graphs, heat maps, parallel coordinates, spider charts, box and whisker plots, mosaic displays, waterfall charts, funnel charts, or radial tree maps. A visualization template may define or describe one or more visualization parameters, such as one or more color parameters. Visualization data for a visualization may include values of one or more of the visualization parameters of the corresponding visualization template.

A view (view object) may be a logical table, or a definition thereof, which may be a collection, a sub-set, or both, of data from one or more data sources, such as columns in one or more tables, such as in the distributed in-memory database 3300. For example, a view may be generated based on an answer, such as by storing the answer as a view. A view may define or describe a data aggregation. A view may be a data source. For example, a view may include references to one or more data sources, such as columns in one or more tables, such as in the distributed in-memory database 3300, which may include a definition or description of an aggregation of the data from a respective data source, and a request for data referencing the view may access the aggregated data, the data from the unaggregated data sources referenced in the worksheet, or a combination thereof. The unaggregated data from data sources referenced in the view defined or described as aggregated data in the view may be unavailable based on the view. A view may be a materialized view or an unmaterialized view. A request for data referencing a materialized view may obtain data from a set of data previously obtained (view-materialization) in accordance with the definition of the view and the request for data. A request for data referencing an unmaterialized view may obtain data from a set of data currently obtained in accordance with the definition of the view and the request for data.

A pinboard (pinboard object), or dashboard, may be a defined collection or grouping of objects, such as visualizations, answers, or insights. Pinboard data for a pinboard may include information associated with the pinboard, which may be associated with respective objects included in the pinboard.

A context (context object) may be a set or collection of data associated with a request for data or a discretely related sequence or series of requests for data or other interactions with the low-latency database analysis system 3000.

A definition may be a set of data describing the structure or organization of a data portion. For example, in the distributed in-memory database 3300, a column definition may define one or more aspects of a column in a table, such as a name of the column, a description of the column, a datatype for the column, or any other information about the column that may be represented as discrete data.

A data source object may represent a source or repository of data accessible by the low-latency database analysis system 3000. A data source object may include data indicating an electronic communication location, such as an address, of a data source, connection information, such as protocol information, authentication information, or a combination thereof, or any other information about the data source that may be represented as discrete data. For example, a data source object may represent a table in the distributed in-memory database 3300 and include data for accessing the table from the database, such as information identifying the database, information identifying a schema within the database, and information identifying the table within the schema within the database. An external data source object may represent an external data source. For example, an external data source object may include data indicating an electronic communication location, such as an address, of an external data source, connection information, such as protocol information, authentication information, or a combination thereof, or any other information about the external data source that may be represented as discrete data.

A sticker (sticker object) may be a description of a classification, category, tag, subject area, or other information that may be associated with one or more other objects such that objects associated with a sticker may be grouped, sorted, filtered, or otherwise identified based on the sticker. In the distributed in-memory database 3300 a tag may be a discrete data portion that may be associated with other data portions, such that data portions associated with a tag may be grouped, sorted, filtered, or otherwise identified based on the tag.

The distributed in-memory ontology unit 3500 generates, maintains, or both, information (ontological data) defining or describing the operative ontological structure of the objects represented in the low-latency database analysis system 3000, such as in the low-latency data stored in the distributed in-memory database 3300, which may include describing attributes, properties, states, or other information about respective objects and may include describing relationships among respective objects.

Objects may be referred to herein as primary objects, secondary objects, or tertiary objects. Other types of objects may be used.

Primary objects may include objects representing distinctly identifiable operative data units or structures representing one or more data portions in the distributed in-memory database 3300, or another data source in the low-latency database analysis system 3000. For example, primary objects may be data source objects, table objects, column objects, relationship objects, or the like. Primary objects may include worksheets, views, filters, such as row-level-security filters and table filters, variables, or the like. Primary objects may be referred to herein as data-objects or queryable-objects.

Secondary objects may be objects representing distinctly identifiable operative data units or structures representing analytical data aggregations, collections, analytical results, visualizations, or groupings thereof, such as pinboard objects, answer objects, insights, visualization objects, and the like. Secondary objects may be referred to herein as analytical-objects.

Tertiary objects may be objects representing distinctly identifiable operative data units or structures representing operational aspects of the low-latency database analysis system 3000, such as one or more entities, users, groups, or organizations represented in the internal data, such as user objects, user-group objects, role objects, sticker objects, and the like.

The distributed in-memory ontology unit 3500 may represent the ontological structure, which may include the objects therein, as a graph having nodes and edges. A node may be a representation of an object in the graph structure of the distributed in-memory ontology unit 3500. A node, representing an object, can include one or more components. The components of a node may be versioned, such as on a per-component basis. For example, a node can include a header component, a content component, or both. A header component may include information about the node. A content component may include the content of the node. An edge may represent a relationship between nodes, which may be directional.

In some implementations, the distributed in-memory ontology unit 3500 graph may include one or more nodes, edges, or both, representing one or more objects, relationships or both, corresponding to a respective internal representation of enterprise data stored in an external enterprise data storage unit, wherein a portion of the data stored in the external enterprise data storage unit represented in the distributed in-memory ontology unit 3500 graph is omitted from the distributed in-memory database 3300.

In some embodiments, the distributed in-memory ontology unit 3500 may generate, modify, or remove a portion of the ontology graph in response to one or more messages, signals, or notifications from one or more of the components of the low-latency database analysis system 3000. For example, the distributed in-memory ontology unit 3500 may generate, modify, or remove a portion of the ontology graph in response to receiving one or more messages, signals, or notifications from the distributed in-memory database 3300 indicating a change to the low-latency data structure. In another example, the distributed in-memory database 3300 may send one or more messages, signals, or notifications indicating a change to the low-latency data structure to the semantic interface unit 3600 and the semantic interface unit 3600 may send one or more messages, signals, or notifications indicating the change to the low-latency data structure to the distributed in-memory ontology unit 3500.

The distributed in-memory ontology unit 3500 may be distributed, in-memory, multi-versioned, transactional, consistent, durable, or a combination thereof. The distributed in-memory ontology unit 3500 is transactional, which may include implementing atomic concurrent, or substantially concurrent, updating of multiple objects. The distributed in-memory ontology unit 3500 is durable, which may include implementing a robust storage that prevents data loss subsequent to or as a result of the completion of an atomic operation. The distributed in-memory ontology unit 3500 is consistent, which may include performing operations associated with a request for data with reference to or using a discrete data set, which may mitigate or eliminate the risk inconsistent results.

The distributed in-memory ontology unit 3500 may generate, output, or both, one or more event notifications. For example, the distributed in-memory ontology unit 3500 may generate, output, or both, a notification, or notifications, in response to a change of the distributed in-memory ontology. The distributed in-memory ontology unit 3500 may identify a portion of the distributed in-memory ontology (graph) associated with a change of the distributed in-memory ontology, such as one or more nodes depending from a changed node, and may generate, output, or both, a notification, or notifications indicating the identified relevant portion of the distributed in-memory ontology (graph). One or more aspects of the low-latency database analysis system 3000 may cache object data and may receive the notifications from the distributed in-memory ontology unit 3500, which may reduce latency and network traffic relative to systems that omit caching object data or omit notifications relevant to changes to portions of the distributed in-memory ontology (graph).

The distributed in-memory ontology unit 3500 may implement prefetching. For example, the distributed in-memory ontology unit 3500 may predictively, such as based on determined probabilistic utility, fetch one or more nodes, such as in response to access to a related node by a component of the low-latency database analysis system 3000.

The distributed in-memory ontology unit 3500 may implement a multi-version concurrency control graph data storage unit. Each node, object, or both, may be versioned. Changes to the distributed in-memory ontology may be reversible. For example, the distributed in-memory ontology may have a first state prior to a change to the distributed in-memory ontology, the distributed in-memory ontology may have a second state subsequent to the change, and the state of the distributed in-memory ontology may be reverted to the first state subsequent to the change, such as in response to the identification of an error or failure associated with the second state.

In some implementations, reverting a node, or a set of nodes, may omit reverting one or more other nodes. In some implementations, the distributed in-memory ontology unit

3500 may maintain a change log indicating a sequential record of changes to the distributed in-memory ontology (graph), such that a change to a node or a set of nodes may be reverted and one or more other changes subsequent to the reverted change may be reverted for consistency.

The distributed in-memory ontology unit 3500 may implement optimistic locking to reduce lock contention times. The use of optimistic locking permits improved throughput of data through the distributed in-memory ontology unit 3500.

The semantic interface unit 3600 may implement procedures and functions to provide a semantic interface between the distributed in-memory database 3300 and one or more of the other components of the low-latency database analysis system 3000.

The semantic interface unit 3600 may implement ontological data management, data-query generation, authentication and access control, object statistical data collection, or a combination thereof.

Ontological data management may include object lifecycle management, object data persistence, ontological modifications, or the like. Object lifecycle management may include creating one or more objects, reading or otherwise accessing one or more objects, updating or modifying one or more objects, deleting or removing one or more objects, or a combination thereof. For example, the semantic interface unit 3600 may interface or communicate with the distributed in-memory ontology unit 3500, which may store the ontological data, object data, or both, to perform object lifecycle management, object data persistence, ontological modifications, or the like.

For example, the semantic interface unit 3600 may receive, or otherwise access, a message, signal, or notification, such as from the distributed in-memory database 3300, indicating the creation or addition of a data portion, such as a table, in the low-latency data stored in the distributed in-memory database 3300, and the semantic interface unit 3600 may communicate with the distributed in-memory ontology unit 3500 to create an object in the ontology representing the added data portion. The semantic interface unit 3600 may transmit, send, or otherwise make available, a notification, message, or signal to the relational search unit 3700 indicating that the ontology has changed.

The semantic interface unit 3600 may receive, or otherwise access, a request message or signal, such as from the relational search unit 3700, indicating a request for information describing changes to the ontology (ontological updates request). The semantic interface unit 3600 may generate and send, or otherwise make available, a response message or signal to the relational search unit 3700 indicating the changes to the ontology (ontological updates response). The semantic interface unit 3600 may identify one or more data portions for indexing based on the changes to the ontology. For example, the changes to the ontology may include adding a table to the ontology, the table including multiple rows, and the semantic interface unit 3600 may identify each row as a data portion for indexing. The semantic interface unit 3600 may include information describing the ontological changes in the ontological updates response. The semantic interface unit 3600 may include one or more data-query definitions, such as data-query definitions for indexing data-queries, for each data portion identified for indexing in the ontological updates response. For example, the data-query definitions may include a sampling data-query, which may be used to query the distributed in-memory database 3300 for sample data from the added data portion, an indexing data-query, which may be used to query the distributed in-memory database 3300 for data from the added data portion, or both.

The semantic interface unit 3600 may receive, or otherwise access, internal signals or messages including data expressing a usage intent, such as data indicating requests to access or modify the low-latency data stored in the distributed in-memory database 3300 (e.g., a request for data). The request to access or modify the low-latency data received by the semantic interface unit 3600 may include a resolved-request. The resolved-request, which may be database and visualization agnostic, may be expressed or communicated as an ordered sequence of tokens, which may represent semantic data. For example, the relational search unit 3700 may tokenize, identify semantics, or both, based on input data, such as input data representing user input, to generate the resolved-request. The resolved-request may include an ordered sequence of tokens that represent the request for data corresponding to the input data, and may transmit, send, or otherwise make accessible, the resolved-request to the semantic interface unit 3600. The semantic interface unit 3600 may process or respond to a received resolved-request.

The semantic interface unit 3600 may process or transform the received resolved-request, which may be, at least in part, incompatible with the distributed in-memory database 3300, to generate one or more corresponding data-queries that are compatible with the distributed in-memory database 3300, which may include generating a proto-query representing the resolved-request, generating a pseudo-query representing the proto-query, and generating the data-query representing the pseudo-query.

The semantic interface unit 3600 may generate a proto-query based on the resolved-request. A proto-query, which may be database agnostic, may be structured or formatted in a form, language, or protocol that differs from the defined structured query language of the distributed in-memory database 3300. Generating the proto-query may include identifying visualization identification data, such as an indication of a type of visualization, associated with the request for data, and generating the proto-query based on the resolved-request and the visualization identification data.

The semantic interface unit 3600 may transform the proto-query to generate a pseudo-query. The pseudo-query, which may be database agnostic, may be structured or formatted in a form, language, or protocol that differs from the defined structured query language of the distributed in-memory database 3300. Generating a pseudo-query may include applying a defined transformation, or an ordered sequence of transformations. Generating a pseudo-query may include incorporating row-level security filters in the pseudo-query.

The semantic interface unit 3600 may generate a data-query based on the pseudo-query, such as by serializing the pseudo-query. The data-query, or a portion thereof, may be structured or formatted using the defined structured query language of the distributed in-memory database 3300. In some implementations, a data-query may be structured or formatted using a defined structured query language of another database, which may differ from the defined structured query language of the distributed in-memory database 3300. Generating the data-query may include using one or more defined rules for expressing respective the structure and content of a pseudo-query in the respective defined structured query language.

The semantic interface unit 3600 may communicate, or issue, the data-query to the distributed in-memory database 3300. In some implementations, processing or responding to a resolved-request may include generating and issuing multiple data-queries to the distributed in-memory database 3300.

The semantic interface unit 3600 may receive results data from the distributed in-memory database 3300 responsive to one or more resolved-requests. The semantic interface unit 3600 may process, format, or transform the results data to obtain visualization data. For example, the semantic interface unit 3600 may identify a visualization for representing or presenting the results data, or a portion thereof, such as based on the results data or a portion thereof. For example, the semantic interface unit 3600 may identifying a bar chart visualization for results data including one measure and attribute.

Although not shown separately in FIG. 3, the semantic interface unit 3600 may include a data visualization unit. In some embodiments, the data visualization unit may be a distinct unit, separate from the semantic interface unit 3600. In some embodiments, the data visualization unit may be included in the system access interface unit 3900. The data visualization unit, the system access interface unit 3900, or a combination thereof, may generate a user interface, or one or more portions thereof. For example, data visualization unit, the system access interface unit 3900, or a combination thereof, may obtain the results data, such as the visualization data, and may generate user interface elements (visualizations) representing the results data.

The semantic interface unit 3600 may implement object-level security, row-level security, or a combination thereof. Object level security may include security associated with an object, such as a table, a column, a worksheet, an answer, or a pinboard. Row-level security may include user-based or group-based access control of rows of data in the low-latency data, the indexes, or both. The semantic interface unit 3600 may implement on or more authentication procedures, access control procedures, or a combination thereof.

The semantic interface unit 3600 may implement one or more user-data integration features. For example, the semantic interface unit 3600 may generate and output a user interface, or a portion thereof, for inputting, uploading, or importing user data, may receive user data, and may import the user data. For example, the user data may be enterprise data.

The semantic interface unit 3600 may implement object statistical data collection. Object statistical data may include, for respective objects, temporal access information, access frequency information, access recency information, access requester information, or the like. For example, the semantic interface unit 3600 may obtain object statistical data as described with respect to the data utility unit 3720, the object utility unit 3810, or both. The semantic interface unit 3600 may send, transmit, or otherwise make available, the object statistical data for data-objects to the data utility unit 3720. The semantic interface unit 3600 may send, transmit, or otherwise make available, the object statistical data for analytical-objects to the object utility unit 3810.

The semantic interface unit 3600 may implement or expose one or more services or application programming interfaces. For example, the semantic interface unit 3600 may implement one or more services for access by the system access interface unit 3900. In some implementations, one or more services or application programming interfaces may be exposed to one or more external devices or systems.

The semantic interface unit 3600 may generate and transmit, send, or otherwise communicate, one or more external communications, such as e-mail messages, such as periodically, in response to one or more events, or both. For example, the semantic interface unit 3600 may generate and transmit, send, or otherwise communicate, one or more external communications including a portable representation, such as a portable document format representation of one or more pinboards in accordance with a defined schedule, period, or interval. In another example, the semantic interface unit 3600 may generate and transmit, send, or otherwise communicate, one or more external communications in response to input data indicating an express request for a communication. In another example, the semantic interface unit 3600 may generate and transmit, send, or otherwise communicate, one or more external communications in response to one or more defined events, such as the expiration of a recency of access period for a user.

Although shown as a single unit in FIG. 3, the relational search unit 3700 may be implemented in a distributed configuration, which may include a primary relational search unit instance and one or more secondary relational search unit instances.

The relational search unit 3700 may generate, maintain, operate, or a combination thereof, one or more indexes, such as one or more of an ontological index, a constituent data index, a control-word index, a numeral index, or a constant index, based on the low-latency data stored in the distributed in-memory database 3300, the low-latency database analysis system 3000, or both. An index may be a defined data structure, or combination of data structures, for storing tokens, terms, or string keys, representing a set of data from one or more defined data sources in a form optimized for searching. For example, an index may be a collection of index shards. In some implementations, an index may be segmented into index segments and the index segments may be sharded into index shards. In some implementations, an index may be partitioned into index partitions, the index partitions may be segmented into index segments and the index segments may be sharded into index shards.

Generating, or building, an index may be performed to create or populate a previously unavailable index, which may be referred to as indexing the corresponding data, and may include regenerating, rebuilding, or reindexing to update or modify a previously available index, such as in response to a change in the indexed data (constituent data).

The ontological index may be an index of data (ontological data) describing the ontological structure or schema of the low-latency database analysis system 3000, the low-latency data stored in the distributed in-memory database 3300, or a combination thereof. For example, the ontological index may include data representing the table and column structure of the distributed in-memory database 3300. The relational search unit 3700 may generate, maintain, or both, the ontological index by communicating with, such as requesting ontological data from, the distributed in-memory ontology unit 3500, the semantic interface unit 3600, or both. Each record in the ontological index may correspond to a respective ontological token, such as a token that identifies a column by name.

The control-word index may be an index of a defined set of control-word tokens. A control-word token may be a character, a symbol, a word, or a defined ordered sequence of characters or symbols, that is identified in one or more grammars of the low-latency database analysis system 3000 as having one or more defined grammatical functions, which may be contextual. For example, the control-word index may include the control-word token "sum", which may be identified in one or more grammars of the low-latency database analysis system 3000 as indicating an additive aggregation. In another example, the control-word index may include the control-word token "top", which may be identified in one or more grammars of the low-latency database analysis system 3000 as indicating a maximal value from an ordered set. In another example, the control-word index may include operator tokens, such as the equality operator token ("="). The constant index may be an index of constant tokens such as "100" or "true". The numeral index may be an index of number word tokens (or named numbers), such as number word tokens for the positive integers between zero and one million, inclusive. For example, "one hundred and twenty eight".

A token may be a word, phrase, character, sequence of characters, symbol, combination of symbols, or the like. A token may represent a data portion in the low-latency data stored in the low-latency data structure. For example, the relational search unit 3700 may automatically generate respective tokens representing the attributes, the measures, the tables, the columns, the values, unique identifiers, tags, links, keys, or any other data portion, or combination of data portions, or a portion thereof. The relational search unit 3700 may classify the tokens, which may include storing token classification data in association with the tokens. For example, a token may be classified as an attribute token, a measure token, a value token, or the like.

The constituent data index may be an index of the constituent data values stored in the low-latency database analysis system 3000, such as in the distributed in-memory database 3300. The relational search unit 3700 may generate, maintain, or both, the constituent data index by communicating with, such as requesting data from, the distributed in-memory database 3300. For example, the relational search unit 3700 may send, or otherwise communicate, a message or signal to the distributed in-memory database 3300 indicating a request to perform an indexing data-query, the relational search unit 3700 may receive response data from the distributed in-memory database 3300 in response to the requested indexing data-query, and the relational search unit 3700 may generate the constituent data index, or a portion thereof, based on the response data. For example, the constituent data index may index data-objects.

An index shard may be used for token searching, such as exact match searching, prefix match searching, substring match searching, or suffix match searching. Exact match searching may include identifying tokens in the index shard that matches a defined target value. Prefix match searching may include identifying tokens in the index shard that include a prefix, or begin with a value, such as a character or string, that matches a defined target value. Substring match searching may include identifying tokens in the index shard that include a value, such as a character or string, that matches a defined target value. Suffix match searching may include identifying tokens in the index shard that include a suffix, or end with a value, such as a character or string, that matches a defined target value. In some implementations, an index shard may include multiple distinct index data structures. For example, an index shard may include a first index data structure optimized for exact match searching, prefix match searching, and suffix match searching, and a second index data structure optimized for substring match searching. Traversing, or otherwise accessing, managing, or using, an index may include identifying one or more of the index shards of the index and traversing the respective index shards. In some implementations, one or more indexes, or index shards, may be distributed, such as replicated on multiple relational search unit instances. For example, the ontological index may be replicated on each relational search unit instance.

The relational search unit 3700 may receive a request for data from the low-latency database analysis system 3000. For example, the relational search unit 3700 may receive data expressing a usage intent indicating the request for data in response to input, such as user input, obtained via a user interface, such as a user interface generated, or partially generated, by the system access interface unit 3900, which may be a user interface operated on an external device, such as one of the client devices 2320, 2340 shown in FIG. 2. In some implementations, the relational search unit 3700 may receive the data expressing the usage intent from the system access interface unit 3900 or from the semantic interface unit 3600. For example, the relational search unit 3700 may receive or access the data expressing the usage intent in a request for data message or signal.

The relational search unit 3700 may process, parse, identify semantics, tokenize, or a combination thereof, the request for data to generate a resolved-request, which may include identifying a database and visualization agnostic ordered sequence of tokens based on the data expressing the usage intent. The data expressing the usage intent, or request for data, may include request data, such as resolved request data, unresolved request data, or a combination of resolved request data and unresolved request data. The relational search unit 3700 may identify the resolved request data. The relational search unit 3700 may identify the unresolved request data and may tokenize the unresolved request data.

Resolved request data may be request data identified in the data expressing the usage intent as resolved request data. Each resolved request data portion may correspond with a respective token in the low-latency database analysis system 3000. The data expressing the usage intent may include information identifying one or more portions of the request data as resolved request data.

Unresolved request data may be request data identified in the data expressing the usage intent as unresolved request data, or request data for which the data expressing the usage intent omits information identifying the request data a resolved request data. Unresolved request data may include text or string data, which may include a character, sequence of characters, symbol, combination of symbols, word, sequence of words, phrase, or the like, for which information, such as tokenization binding data, identifying the text or string data as resolved request data is absent or omitted from the request data. The data expressing the usage intent may include information identifying one or more portions of the request data as unresolved request data. The data expressing the usage intent may omit information identifying whether one or more portions of the request data are resolved request data. The relational search unit 3700 may identify one or more portions of the request data for which the data expressing the usage intent omits information identifying whether the one or more portions of the request data are resolved request data as unresolved request data.

For example, the data expressing the usage intent may include a request string and one or more indications that one or more portions of the request string are resolved request data. One or more portions of the request string that are not identified as resolved request data in the data expressing the usage intent may be identified as unresolved request data. For example, the data expressing the usage intent may include the request string "example text"; the data expressing the usage intent may include information indicating that the first portion of the request string, "example", is resolved request data; and the data expressing the usage intent may omit information indicating that the second portion of the request string, "text", is resolved request data.

The information identifying one or more portions of the request data as resolved request data may include tokenization binding data indicating a previously identified token corresponding to the respective portion of the request data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used. In some implementations, the data expressing the usage intent may omit the tokenization binding data and may include an identifier that identifies the tokenization binding data.

The relational search unit 3700 may implement or access one or more grammar-specific tokenizers, such as a tokenizer for a defined data-analytics grammar or a tokenizer for a natural-language grammar. For example, the relational search unit 3700 may implement one or more of a formula tokenizer, a row-level-security tokenizer, a relational search tokenizer, or a natural language tokenizer. Other tokenizers may be used. In some implementations, the relational search unit 3700 may implement one or more of the grammar-specific tokenizers, or a portion thereof, by accessing another component of the low-latency database analysis system 3000 that implements the respective grammar-specific tokenizer, or a portion thereof. For example, the natural language processing unit 3710 may implement the natural language tokenizer and the relational search unit 3700 may access the natural language processing unit 3710 to implement natural language tokenization.

A tokenizer, such as the relational search tokenizer, may parse text or string data (request string), such as string data included in a data expressing the usage intent, in a defined read order, such as from left to right, such as on a character-by-character or symbol-by-symbol basis. For example, a request string may include a single character, symbol, or letter, and tokenization may include identifying one or more tokens matching, or partially matching, the input character.

Tokenization may include parsing the request string to identify one or more words or phrases. For example, the request string may include a sequence of characters, symbols, or letters, and tokenization may include parsing the sequence of characters in a defined order, such as from left to right, to identify distinct words or terms and identifying one or more tokens matching the respective words. In some implementations, word or phrase parsing may be based on one or more of a set of defined delimiters, such as a whitespace character, a punctuation character, or a mathematical operator.

The relational search unit 3700 may traverse one or more of the indexes to identify one or more tokens corresponding to a character, word, or phrase identified in request string. Tokenization may include identifying multiple candidate tokens matching a character, word, or phrase identified in request string. Candidate tokens may be ranked or ordered, such as based on probabilistic utility.

Tokenization may include match-length maximization. Match-length maximization may include ranking or ordering candidate matching tokens in descending magnitude order. For example, the longest candidate token, having the largest cardinality of characters or symbols, matching the request string, or a portion thereof, may be the highest ranked candidate token. For example, the request string may include a sequence of words or a semantic phrase, and tokenization may include identifying one or more tokens matching the input semantic phrase. In another example, the request string may include a sequence of phrases, and tokenization may include identifying one or more tokens matching the input word sequence. In some implementations, tokenization may include identifying the highest ranked candidate token for a portion of the request string as a resolved token for the portion of the request string.

The relational search unit 3700 may implement one or more finite state machines. For example, tokenization may include using one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input (e.g., input to the finite state machine). A transition may define one or more actions or operations that the relational search unit 3700 may implement. One or more of the finite state machines may be non-deterministic, such that the finite state machine may transition from a state to zero or more subsequent states.

The relational search unit 3700 may generate, instantiate, or operate a tokenization finite state machine, which may represent the respective tokenization grammar. Generating, instantiating, or operating a finite state machine may include operating a finite state machine traverser for traversing the finite state machine. Instantiating the tokenization finite state machine may include entering an empty state, indicating the absence of received input. The relational search unit 3700 may initiate or execute an operation, such as an entry operation, corresponding to the empty state in response to entering the empty state. Subsequently, the relational search unit 3700 may receive input data, and the tokenization finite state machine may transition from the empty state to a state corresponding to the received input data. In some embodiments, the relational search unit 3700 may initiate one or more data-queries in response to transitioning to or from a respective state of a finite state machine. In the tokenization finite state machine, a state may represent a possible next token in the request string. The tokenization finite state machine may transition between states based on one or more defined transition weights, which may indicate a probability of transiting from a state to a subsequent state.

The tokenization finite state machine may determine tokenization based on probabilistic path utility. Probabilistic path utility may rank or order multiple candidate traversal paths for traversing the tokenization finite state machine based on the request string. The candidate paths may be ranked or ordered based on one or more defined probabilistic path utility metrics, which may be evaluated in a defined sequence. For example, the tokenization finite state machine may determine probabilistic path utility by evaluating the weights of the respective candidate transition paths, the lengths of the respective candidate transition paths, or a combination thereof. In some implementations, the weights of the respective candidate transition paths may be evaluated with high priority relative to the lengths of the respective candidate transition paths.

In some implementations, one or more transition paths evaluated by the tokenization finite state machine may include a bound state such that the candidate tokens available for tokenization of a portion of the request string may be limited based on the tokenization of a previously tokenized portion of the request string.

Tokenization may include matching a portion of the request string to one or more token types, such as a constant token type, a column name token type, a value token type, a control-word token type, a date value token type, a string value token type, or any other token type defined by the low-latency database analysis system 3000. A constant token type may be a fixed, or invariant, token type, such as a numeric value. A column name token type may correspond with a name of a column in the data model. A value token type may correspond with an indexed data value. A control-word token type may correspond with a defined set of control-words. A date value token type may be similar to a control-word token type and may correspond with a defined set of control-words for describing temporal information. A string value token type may correspond with an unindexed value.

Token matching may include ordering or weighting candidate token matches based on one or more token matching metrics. Token matching metrics may include whether a candidate match is within a defined data scope, such as a defined set of tables, wherein a candidate match outside the defined data scope (out-of-scope) may be ordered or weighted lower than a candidate match within the define data scope (in-scope). Token matching metrics may include whether, or the degree to which, a candidate match increases query complexity, such as by spanning multiple roots, wherein a candidate match that increases complexity may be ordered or weighted lower than a candidate match that does not increase complexity or increases complexity to a lesser extent. Token matching metrics may include whether the candidate match is an exact match or a partial match, wherein a candidate match that is a partial may be ordered or weighted lower than a candidate match that is an exact match. In some implementations, the cardinality of the set of partial matches may be limited to a defined value.

Token matching metrics may include a token score (TokenScore), wherein a candidate match with a relatively low token score may be ordered or weighted lower than a candidate match with a relatively high token score. The token score for a candidate match may be determined based one or more token scoring metrics. The token scoring metrics may include a finite state machine transition weight metric (FSMScore), wherein a weight of transitioning from a current state of the tokenization finite state machine to a state indicating a candidate matching token is the finite state machine transition weight metric. The token scoring metrics may include a cardinality penalty metric (CardinalityScore), wherein a cardinality of values (e.g., unique values) corresponding to the candidate matching token is used as a penalty metric (inverse cardinality), which may reduce the token score. The token scoring metrics may include an index utility metric (IndexScore), wherein a defined utility value, such as one, associated with an object, such as a column wherein the matching token represents the column or a value from the column, is the index utility metric. In some implementations, the defined utility values may be configured, such as in response to user input, on a per object (e.g., per column) basis. The token scoring metrics may include a usage metric (UBRScore). The usage metric may be determined based on a usage based ranking index, one or more usage ranking metrics, or a combination thereof. Determining the usage metric (UBRScore) may include determining a usage boost value (UBRBoost). The token score may be determined based on a defined combination of token scoring metrics. For example, determining the token score may be expressed as the following:

TokenScore=FSMScore*(IndexScore+
UBRScore*UBRBoost)+Min(CardinalityScore,
1).

Token matching may include grouping candidate token matches by match type, ranking or ordering on a per-match type basis based on token score, and ranking or ordering the match types. For example, the match types may include a first match type for exact matches (having the highest match type priority order), a second match type for prefix matches on ontological data (having a match type priority order lower than the first match type), a third match type for substring matches on ontological data and prefix matches on data values (having a match type priority order lower than the second match type), a fourth match type for substring matches on data values (having a match type priority order lower than the third match type), and a fifth match type for matches omitted from the first through fourth match types (having a match type priority order lower than the fourth match type). Other match types and match type orders may be used.

Tokenization may include ambiguity resolution. Ambiguity resolution may include token ambiguity resolution, join-path ambiguity resolution, or both. In some implementations, ambiguity resolution may cease tokenization in response to the identification of an automatic ambiguity resolution error or failure.

Token ambiguity may correspond with identifying two or more exactly matching candidate matching tokens. Token ambiguity resolution may be based on one or more token ambiguity resolution metrics. The token ambiguity resolution metrics may include using available previously resolved token matching or binding data and token ambiguity may be resolved in favor of available previously resolved token matching or binding data, other relevant tokens resolved from the request string, or both. The token ambiguity resolution may include resolving token ambiguity in favor of integer constants. The token ambiguity resolution may include resolving token ambiguity in favor of control-words, such as for tokens at the end of a request for data, such as last, that are not being edited.

Join-path ambiguity may correspond with identifying matching tokens having two or more candidate join paths. Join-path ambiguity resolution may be based on one or more join-path ambiguity resolution metrics. The join-path ambiguity resolution metrics may include using available previously resolved join-path binding data and join-path ambiguity may be resolved in favor of available previously resolved join-paths. The join-path ambiguity resolution may include favoring join paths that include in-scope objects over join paths that include out-of-scope objects. The join-path ambiguity resolution metrics may include a complexity minimization metric, which may favor a join path that omits or avoids increasing complexity over join paths that increase complexity, such as a join path that may introduce a chasm trap.

The relational search unit 3700 may identify a resolved-request based on the request string. The resolved-request, which may be database and visualization agnostic, may be expressed or communicated as an ordered sequence of tokens representing the request for data indicated by the request string. The relational search unit 3700 may instantiate, or generate, one or more resolved-request objects. For example, the relational search unit 3700 may create or store a resolved-request object corresponding to the resolved-request in the distributed in-memory ontology unit 3500. The relational search unit 3700 may transmit, send, or otherwise make available, the resolved-request to the semantic interface unit 3600.

In some implementations, the relational search unit 3700 may transmit, send, or otherwise make available, one or more resolved-requests, or portions thereof, to the semantic interface unit 3600 in response to finite state machine transitions. For example, the relational search unit 3700 may instantiate a search object in response to a first transition of a finite state machine. The relational search unit 3700 may include a first search object instruction in the search object in response to a second transition of the finite state machine. The relational search unit 3700 may send the search object including the first search object instruction to the semantic interface unit 3600 in response to the second transition of the finite state machine. The relational search unit 3700 may include a second search object instruction in the search object in response to a third transition of the finite state machine. The relational search unit 3700 may send the search object including the search object instruction, or a combination of the first search object instruction and the second search object instruction, to the semantic interface unit 3600 in response to the third transition of the finite state machine. The search object instructions may be represented using any annotation, instruction, text, message, list, pseudo-code, comment, or the like, or any combination thereof that may be converted, transcoded, or translated into structured search instructions for retrieving data from the low-latency data.

The relational search unit 3700 may provide an interface to permit the creation of user-defined syntax. For example, a user may associate a string with one or more tokens. Accordingly, when the string is entered, the pre-associated tokens are returned in lieu of searching for tokens to match the input.

The relational search unit 3700 may include a localization unit (not expressly shown). The localization, globalization, regionalization, or internationalization, unit may obtain source data expressed in accordance with a source expressive-form and may output destination data representing the source data, or a portion thereof, and expressed using a destination expressive-form. The data expressive-forms, such as the source expressive-form and the destination expressive-form, may include regional or customary forms of expression, such as numeric expression, temporal expression, currency expression, alphabets, natural-language elements, measurements, or the like. For example, the source expressive-form may be expressed using a canonical-form, which may include using a natural-language, which may be based on English, and the destination expressive-form may be expressed using a locale-specific form, which may include using another natural-language, which may be a natural-language that differs from the canonical-language. In another example, the destination expressive-form and the source expressive-form may be locale-specific expressive-forms and outputting the destination expressive-form representation of the source expressive-form data may include obtaining a canonical-form representation of the source expressive-form data and obtaining the destination expressive-form representation based on the canonical-form representation. Although, for simplicity and clarity, the grammars described herein, such as the data-analytics grammar and the natural language search grammar, are described with relation to the canonical expressive-form, the implementation of the respective grammars, or portions thereof, described herein may implement locale-specific expressive-forms. For example, the relational search tokenizer may include multiple locale-specific relational search tokenizers.

The natural language processing unit 3710 may receive input data including a natural language string, such as a natural language string generated in accordance with user input. The natural language string may represent a data request expressed in an unrestricted natural language form, for which data identified or obtained prior to, or in conjunction with, receiving the natural language string by the natural language processing unit 3710 indicating the semantic structure, correlation to the low-latency database analysis system 3000, or both, for at least a portion of the natural language string is unavailable or incomplete. Although not shown separately in FIG. 3, in some implementations, the natural language string may be generated or determined based on processing an analog signal, or a digital representation thereof, such as an audio stream or recording or a video stream or recording, which may include using speech-to-text conversion.

The natural language processing unit 3710 may analyze, process, or evaluate the natural language string, or a portion thereof, to generate or determine the semantic structure, correlation to the low-latency database analysis system 3000, or both, for at least a portion of the natural language string. For example, the natural language processing unit 3710 may identify one or more words or terms in the natural language string and may correlate the identified words to tokens defined in the low-latency database analysis system 3000. In another example, the natural language processing unit 3710 may identify a semantic structure for the natural language string, or a portion thereof. In another example, the natural language processing unit 3710 may identify a probabilistic intent for the natural language string, or a portion thereof, which may correspond to an operative feature of the low-latency database analysis system 3000, such as retrieving data from the internal data, analyzing data the internal data, or modifying the internal data.

The natural language processing unit 3710 may send, transmit, or otherwise communicate request data indicating the tokens, relationships, semantic data, probabilistic intent, or a combination thereof or one or more portions thereof, identified based on a natural language string to the relational search unit 3700.

The data utility unit 3720 may receive, process, and maintain user-agnostic utility data, such as system configuration data, user-specific utility data, such as utilization data, or both user-agnostic and user-specific utility data. The utility data may indicate whether a data portion, such as a column, a record, an insight, or any other data portion, has high utility or low utility within the system, such across all users of the system. For example, the utility data may indicate that a defined column is a high-utility column or a low-utility column. The data utility unit 3720 may store the utility data, such as using the low-latency data structure. For example, in response to a user using, or accessing, a data portion, data utility unit 3720 may store utility data indicating the usage, or access, event for the data portion, which may include incrementing a usage event counter associated with the data portion. In some embodiments, the data utility unit 3720 may receive the information indicating the usage, or access, event for the data portion from the insight unit 3730, and the usage, or access, event for the data portion may indicate that the usage is associated with an insight.

The data utility unit 3720 may receive a signal, message, or other communication, indicating a request for utility information. The request for utility information may indicate an object or data portion. The data utility unit 3720 may determine, identify, or obtain utility data associated with the identified object or data portion. The data utility unit 3720 may generate and send utility response data responsive to the request that may indicate the utility data associated with the identified object or data portion.

The data utility unit 3720 may generate, maintain, operate, or a combination thereof, one or more indexes, such as one or more of a usage (or utility) index, a resolved-request index, or a phrase index, based on the low-latency data stored in the distributed in-memory database 3300, the low-latency database analysis system 3000, or both.

The insight unit 3730 may automatically identify one or more insights, which may be data other than data expressly requested by a user, and which may be identified and prioritized, or both, based on probabilistic utility.

The object search unit 3800 may generate, maintain, operate, or a combination thereof, one or more object-indexes, which may be based on the analytical-objects represented in the low-latency database analysis system 3000, or a portion thereof, such as pinboards, answers, and worksheets. An object-index may be a defined data structure, or combination of data structures, for storing analytical-object data in a form optimized for searching. Although shown as a single unit in FIG. 3, the object search unit 3800 may interface with a distinct, separate, object indexing unit (not expressly shown).

The object search unit 3800 may include an object-index population interface, an object-index search interface, or both. The object-index population interface may obtain and store, load, or populate analytical-object data, or a portion thereof, in the object-indexes. The object-index search interface may efficiently access or retrieve analytical-object data from the object-indexes such as by searching or traversing the object-indexes, or one or more portions thereof. In some implementations, the object-index population interface, or a portion thereof, may be a distinct, independent unit.

The object-index population interface may populate, update, or both the object-indexes, such as periodically, such as in accordance with a defined temporal period, such as thirty minutes. Populating, or updating, the object-indexes may include obtaining object indexing data for indexing the analytical-objects represented in the low-latency database analysis system 3000. For example, the object-index population interface may obtain the analytical-object indexing data, such as from the distributed in-memory ontology unit 3500. Populating, or updating, the object-indexes may include generating or creating an indexing data structure representing an object. The indexing data structure for representing an object may differ from the data structure used for representing the object in other components of the low-latency database analysis system 3000, such as in the distributed in-memory ontology unit 3500.

The object indexing data for an analytical-object may be a subset of the object data for the analytical-object. The object indexing data for an analytical-object may include an object identifier for the analytical-object uniquely identifying the analytical-object in the low-latency database analysis system 3000, or in a defined data-domain within the low-latency database analysis system 3000. The low-latency database analysis system 3000 may uniquely, unambiguously, distinguish an object from other objects based on the object identifier associated with the object. The object indexing data for an analytical-object may include data non-uniquely identifying the object. The low-latency database analysis system 3000 may identify one or more analytical-objects based on the non-uniquely identifying data associated with the respective objects, or one or more portions thereof. In some implementations, an object identifier may be an ordered combination of non-uniquely identifying object data that, as expressed in the ordered combination, is uniquely identifying. The low-latency database analysis system 3000 may enforce the uniqueness of the object identifiers.

Populating, or updating, the object-indexes may include indexing the analytical-object by including or storing the object indexing data in the object-indexes. For example, the object indexing data may include data for an analytical-object, the object-indexes may omit data for the analytical-object, and the object-index population interface may include or store the object indexing data in an object-index. In another example, the object indexing data may include data for an analytical-object, the object-indexes may include data for the analytical-object, and the object-index population interface may update the object indexing data for the analytical-object in the object-indexes in accordance with the object indexing data.

Populating, or updating, the object-indexes may include obtaining object utility data for the analytical-objects represented in the low-latency database analysis system 3000. For example, the object-index population interface may obtain the object utility data, such as from the object utility unit 3810. The object-index population interface may include the object utility data in the object-indexes in association with the corresponding objects.

In some implementations, the object-index population interface may receive, obtain, or otherwise access the object utility data from a distinct, independent, object utility data population unit, which may read, obtain, or otherwise access object utility data from the object utility unit 3810 and may send, transmit, or otherwise provide, the object utility data to the object search unit 3800. The object utility data population unit may send, transmit, or otherwise provide, the object utility data to the object search unit 3800 periodically, such as in accordance with a defined temporal period, such as thirty minutes.

The object-index search interface may receive, access, or otherwise obtain data expressing a usage intent with respect to the low-latency database analysis system 3000, which may represent a request to access data in the low-latency database analysis system 3000, which may represent a request to access one or more analytical-objects represented in the low-latency database analysis system 3000. The object-index search interface may generate one or more object-index queries based on the data expressing the usage intent. The object-index search interface may send, transmit, or otherwise make available the object-index queries to one or more of the object-indexes.

The object-index search interface may receive, obtain, or otherwise access object search results data indicating one or more analytical-objects identified by searching or traversing the object-indexes in accordance with the object-index queries. The object-index search interface may sort or rank the object search results data based on probabilistic utility in accordance with the object utility data for the analytical-objects in the object search results data. In some implementations, the object-index search interface may include one or more object search ranking metrics with the object-index queries and may receive the object search results data sorted or ranked based on probabilistic utility in accordance with the object utility data for the objects in the object search results data and in accordance with the object search ranking metrics.

For example, the data expressing the usage intent may include a user identifier, and the object search results data may include object search results data sorted or ranked based on probabilistic utility for the user. In another example, the data expressing the usage intent may include a user identifier and one or more search terms, and the object search results data may include object search results data sorted or ranked based on probabilistic utility for the user identified by searching or traversing the object-indexes in accordance with the search terms.

The object-index search interface may generate and send, transmit, or otherwise make available the sorted or ranked object search results data to another component of the low-latency database analysis system 3000, such as for further processing and display to the user.

The object utility unit 3810 may receive, process, and maintain user-specific object utility data for objects represented in the low-latency database analysis system 3000. The user-specific object utility data may indicate whether an object has high utility or low utility for the user.

The object utility unit 3810 may store the user-specific object utility data, such as on a per-object basis, a per-activity basis, or both. For example, in response to data indicating an object access activity, such as a user using, viewing, or otherwise accessing, an object, the object utility unit 3810 may store user-specific object utility data indicating the object access activity for the object, which may include incrementing an object access activity counter associated with the object, which may be a user-specific object access activity counter. In another example, in response to data indicating an object storage activity, such as a user storing an object, the object utility unit 3810 may store user-specific object utility data indicating the object storage activity for the object, which may include incrementing a storage activity counter associated with the object, which may be a user-specific object storage activity counter. The user-specific object utility data may include temporal information, such as a temporal location identifier associated with the object activity. Other information associated with the object activity may be included in the object utility data.

The object utility unit 3810 may receive a signal, message, or other communication, indicating a request for object utility information. The request for object utility information may indicate one or more objects, one or more users, one or more activities, temporal information, or a combination thereof. The request for object utility information may indicate a request for object utility data, object utility counter data, or both.

The object utility unit 3810 may determine, identify, or obtain object utility data in accordance with the request for object utility information. The object utility unit 3810 may generate and send object utility response data responsive to the request that may indicate the object utility data, or a portion thereof, in accordance with the request for object utility information.

For example, a request for object utility information may indicate a user, an object, temporal information, such as information indicating a temporal span, and an object activity, such as the object access activity. The request for object utility information may indicate a request for object utility counter data. The object utility unit 3810 may determine, identify, or obtain object utility counter data associated with the user, the object, and the object activity having a temporal location within the temporal span, and the object utility unit 3810 may generate and send object utility response data including the identified object utility counter data.

In some implementations, a request for object utility information may indicate multiple users, or may omit indicating a user, and the object utility unit 3810 may identify user-agnostic object utility data aggregating the user-specific object utility data. In some implementations, a request for object utility information may indicate multiple objects, may omit indicating an object, or may indicate an object type, such as answer, pinboard, or worksheet, and the object utility unit 3810 may identify the object utility data by aggregating the object utility data for multiple objects in accordance with the request. Other object utility aggregations may be used.

The system configuration unit 3820 implement or apply one or more low-latency database analysis system configurations to enable, disable, or configure one or more operative features of the low-latency database analysis system 3000. The system configuration unit 3820 may store data representing or defining the one or more low-latency database analysis system configurations. The system configuration unit 3820 may receive signals or messages indicating input data, such as input data generated via a system access interface, such as a user interface, for accessing or modifying the low-latency database analysis system configurations. The system configuration unit 3820 may generate, modify, delete, or otherwise maintain the low-latency database analysis system configurations, such as in response to the input data. The system configuration unit 3820 may generate or determine output data, and may output the output data, for a system access interface, or a portion or portions thereof, for the low-latency database analysis system configurations, such as for presenting a user interface for the low-latency database analysis system configurations. Although not shown in FIG. 3, the system configuration unit 3820 may communicate with a repository, such as an external centralized repository, of low-latency database analysis system configurations; the system configuration unit 3820 may receive one or more low-latency database analysis system configurations from the repository, and may control or configure one or more operative features of the low-latency database analysis system 3000 in response to receiving one or more low-latency database analysis system configurations from the repository.

The user customization unit 3830 may receive, process, and maintain user-specific utility data, such as user defined configuration data, user defined preference data, or a combination thereof. The user-specific utility data may indicate whether a data portion, such as a column, a record, autonomous-analysis data, or any other data portion or object, has high utility or low utility to an identified user. For example, the user-specific utility data may indicate that a defined column is a high-utility column or a low-utility column. The user customization unit 3830 may store the user-specific utility data, such as using the low-latency data structure. The user-specific utility data may include, feedback data, such as feedback indicating user input expressly describing or representing the utility of a data portion or object in response to utilization of the data portion or object, such as positive feedback indicating high utility or negative feedback indicating low utility. The user customization unit 3830 may store the feedback in association with a user identifier. The user customization unit 3830 may store the feedback in association with the context in which feedback was obtained. The user customization data, or a portion thereof, may be stored in an in-memory storage unit of the low-latency database analysis system. In some implementations, the user customization data, or a portion thereof, may be stored in the persistent storage unit 3930.

The system access interface unit 3900 may interface with, or communicate with, a system access unit (not shown in FIG. 3), which may be a client device, a user device, or another external device or system, or a combination thereof, to provide access to the internal data, features of the low-latency database analysis system 3000, or a combination thereof. For example, the system access interface unit 3900 may receive signals, message, or other communications representing interactions with the internal data, such as data expressing a usage intent and may output response messages, signals, or other communications responsive to the received requests.

The system access interface unit 3900 may generate data for presenting a user interface, or one or more portions thereof, for the low-latency database analysis system 3000. For example, the system access interface unit 3900 may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of the system access unit. For example, the system access unit may present the user interface via a web browser or a web application and the instructions may be in the form of HTML, JavaScript, or the like.

In an example, the system access interface unit 3900 may include a search field user interface element in the user interface. The search field user interface element may be an unstructured search string user input element or field. The system access unit may display the unstructured search string user input element. The system access unit may receive input data, such as user input data, corresponding to the unstructured search string user input element. The system access unit may transmit, or otherwise make available, the unstructured search string user input to the system access interface unit 3900. The user interface may include other user interface elements and the system access unit may transmit, or otherwise make available, other user input data to the system access interface unit 3900.

The system access interface unit 3900 may obtain the user input data, such as the unstructured search string, from the system access unit. The system access interface unit 3900 may transmit, or otherwise make available, the user input data to one or more of the other components of the low-latency database analysis system 3000.

In some embodiments, the system access interface unit 3900 may obtain the unstructured search string user input as a sequence of individual characters or symbols, and the system access interface unit 3900 may sequentially transmit, or otherwise make available, individual or groups of characters or symbols of the user input data to one or more of the other components of the low-latency database analysis system 3000.

In some embodiments, system access interface unit 3900 may obtain the unstructured search string user input may as a sequence of individual characters or symbols, the system access interface unit 3900 may aggregate the sequence of individual characters or symbols, and may sequentially transmit, or otherwise make available, a current aggregation of the received user input data to one or more of the other components of the low-latency database analysis system 3000, in response to receiving respective characters or symbols from the sequence, such as on a per-character or per-symbol basis.

The real-time collaboration unit 3910 may receive signals or messages representing input received in accordance with multiple users, or multiple system access devices, associated with a collaboration context or session, may output data, such as visualizations, generated or determined by the low-latency database analysis system 3000 to multiple users associated with the collaboration context or session, or both. The real-time collaboration unit 3910 may receive signals or messages representing input received in accordance with one or more users indicating a request to establish a collaboration context or session, and may generate, maintain, or modify collaboration data representing the collaboration context or session, such as a collaboration session identifier. The real-time collaboration unit 3910 may receive signals or messages representing input received in accordance with one or more users indicating a request to participate in, or otherwise associate with, a currently active collaboration context or session, and may associate the one or more users with the currently active collaboration context or session. In some implementations, the input, output, or both, of the real-time collaboration unit 3910 may include synchronization data, such as temporal data, that may be used to maintain synchronization, with respect to the collaboration context or session, among the low-latency database analysis system 3000 and one or more system access devices associated with, or otherwise accessing, the collaboration context or session.

The third-party integration unit 3920 may include an electronic communication interface, such as an application programming interface (API), for interfacing or communicating between an external, such as third-party, application or system, and the low-latency database analysis system 3000. For example, the third-party integration unit 3920 may include an electronic communication interface to transfer data between the low-latency database analysis system 3000 and one or more external applications or systems, such as by importing data into the low-latency database analysis system 3000 from the external applications or systems or exporting data from the low-latency database analysis system 3000 to the external applications or systems. For example, the third-party integration unit 3920 may include an electronic communication interface for electronic communication with an external exchange, transfer, load (ETL) system, which may import data into the low-latency database analysis system 3000 from an external data source or may export data from the low-latency database analysis system 3000 to an external data repository. In another example, the third-party integration unit 3920 may include an electronic communication interface for electronic communication with external machine learning analysis software, which may export data from the low-latency database analysis system 3000 to the external machine learning analysis software and may import data into the low-latency database analysis system 3000 from the external machine learning analysis software. The third-party integration unit 3920 may transfer data independent of, or in conjunction with, the system access interface unit 3900, the enterprise data interface unit 3400, or both.

The persistent storage unit 3930 may include an interface for storing data on, accessing data from, or both, one or more persistent data storage devices or systems. For example, the persistent storage unit 3930 may include one or more persistent data storage devices, such as the static memory 1200 shown in FIG. 1. Although shown as a single unit in FIG. 3, the persistent storage unit 3930 may include multiple components, such as in a distributed or clustered configuration. The persistent storage unit 3930 may include one or more internal interfaces, such as electronic communication or application programming interfaces, for receiving data from, sending data to, or both other components of the low-latency database analysis system 3000. The persistent storage unit 3930 may include one or more external interfaces, such as electronic communication or application programming interfaces, for receiving data from, sending data to, or both, one or more external systems or devices, such as an external persistent storage system. For example, the persistent storage unit 3930 may include an internal interface for obtaining key-value tuple data from other components of the low-latency database analysis system 3000, an external interface for sending the key-value tuple data to, or storing the key-value tuple data on, an external persistent storage system, an external interface for obtaining, or otherwise accessing, the key-value tuple data from the external persistent storage system, and an internal key-value tuple data for sending, or otherwise making available, the key-value tuple data to other components of the low-latency database analysis system 3000. In another example, the persistent storage unit 3930 may include a first external interface for storing data on, or obtaining data from, a first external persistent storage system, and a second external interface for storing data on, or obtaining data from, a second external persistent storage system.

FIG. 4 illustrates an example 4000 of a sharding agnostic aggregation operation. In the example 4000, data of a table is not partitioned according to a grouping column or an aggregation column of a data-query that is a data-query for aggregations together with groupings of data in a distributed database. The example 4000 illustrates a table 4100 that includes the columns ID, A, B, and C. The values of the A, B, and C columns can be of any data types (e.g., integer, character, variable character, date, timestamp, or any other data type). The ID column is used herein as a row identifier. "Row X," as used herein, should be understood to mean "the row having the value of X for the ID column." For example, "row 18" should be read as "the row having the value 18 for the ID column." That is row 18 is the row indicated with numeral 4152. Additionally, the values used for the columns A, B, and C are for illustration purposes and no special semantics should be attached to them.

The table 4100 is sharded into two shards, a first shard 4200 and a second shard 4300. In the example 4000, the table 4100 is sharded such the first shard 4200 includes all rows having an ID value between 1 and 10 (i.e., the rows above a line 4150); and the second shard 4300 includes all rows having an ID value between 11 and 20 (i.e., the rows below the line 4150).

To execute a query "select count (distinct A) from T group by B," where T is the table 4100, the query can be executed according to the following high level steps.

In a first step, distinct elements of A for each value of B are computed for (i.e., at) each shard. The distinct elements of A for each value of B, as computed by a the first database instance using the first shard 4200, are shown in a first result 4400; and the distinct elements of A for each value of B, as computed by a the second database instance using the second shard 4300, are shown in a second result 4500. The first database instance and the second database instance can be said to manage (e.g., hold, etc.) the first shard 4200 and the second shard 4300, respectively. Equivalently, the first shard 4200 and the second shard 4300 can be said to be distributed to the first database instance and the second database instance, respectively.

The first result 4400 illustrates that the first shard 4200 includes, for the value Val_B_1 of B, the distinct value Val_A_2 of A; for the value Val_B_2 of B, the distinct values Val_A_1 and Val_A_2 of A; and for the value Val_B_3 of B, the distinct values Val_A_1 and Val_A_2 of A. The second result 4500 illustrates that the second shard 4300 includes, for the value Val_B_1 of B, the distinct values Val_A_2 and Val_A_3 of A; for the value Val_B_2 of B, the distinct values Val_A_3 and Val_A_4 of A; and for the value Val_B_3 of B, the distinct values Val_A_2 and Val_A_3 of A. It is noted that the first step does not include calculating counts 4410 and 4510 of the distinct values. The counts 4410 and 4510 are shown for comparative reasons discussed below.

In a second step, the distinct elements of A for each B are obtained from the database instances at one database instance. The one database instance can be, or can act as, a query coordinator as described herein. The query coordinator can be one of the first database instance or the second database instance. The one database instance receives the first result 4400 and the second result 4500. That is, the one data instance receives, in addition to the values of B, the distinct values of A for each value of B from each of the database instances.

In a third step, a union of the distinct elements for each value of B is performed by the query coordinator. Unioning (e.g., performing a union operation) is necessary to remove the duplicate distinct values of A for each grouping of B. To illustrate, the first result 4400 includes the distinct value Val_A_2 of A and the second result 4500 includes the distinct values Val_A_2 and Val_A_3 for the value Val_B_1 of B. Thus, the first result 4400 and the second result 4500 include redundant data. Unioning removes the redundancies and prevents double counting.

In an fourth step, the size of the set for each B is computed and results 4600 are obtained.

Without the unioning operation of the third step, the count of distinct values A for the value Val_B_1 of B would be 1 (from the counts 4410)+2 (from the counts 4510)=3, which is not correct. The correct answer is 2, as shown in results 4600. To perform the union operation, all distinct values of A may be transmitted from each database instance to the query coordinator, which can degrade network performance. Additionally, performing the union operation at the query coordinator degrades performance of the query coordinator.

Figure 5:
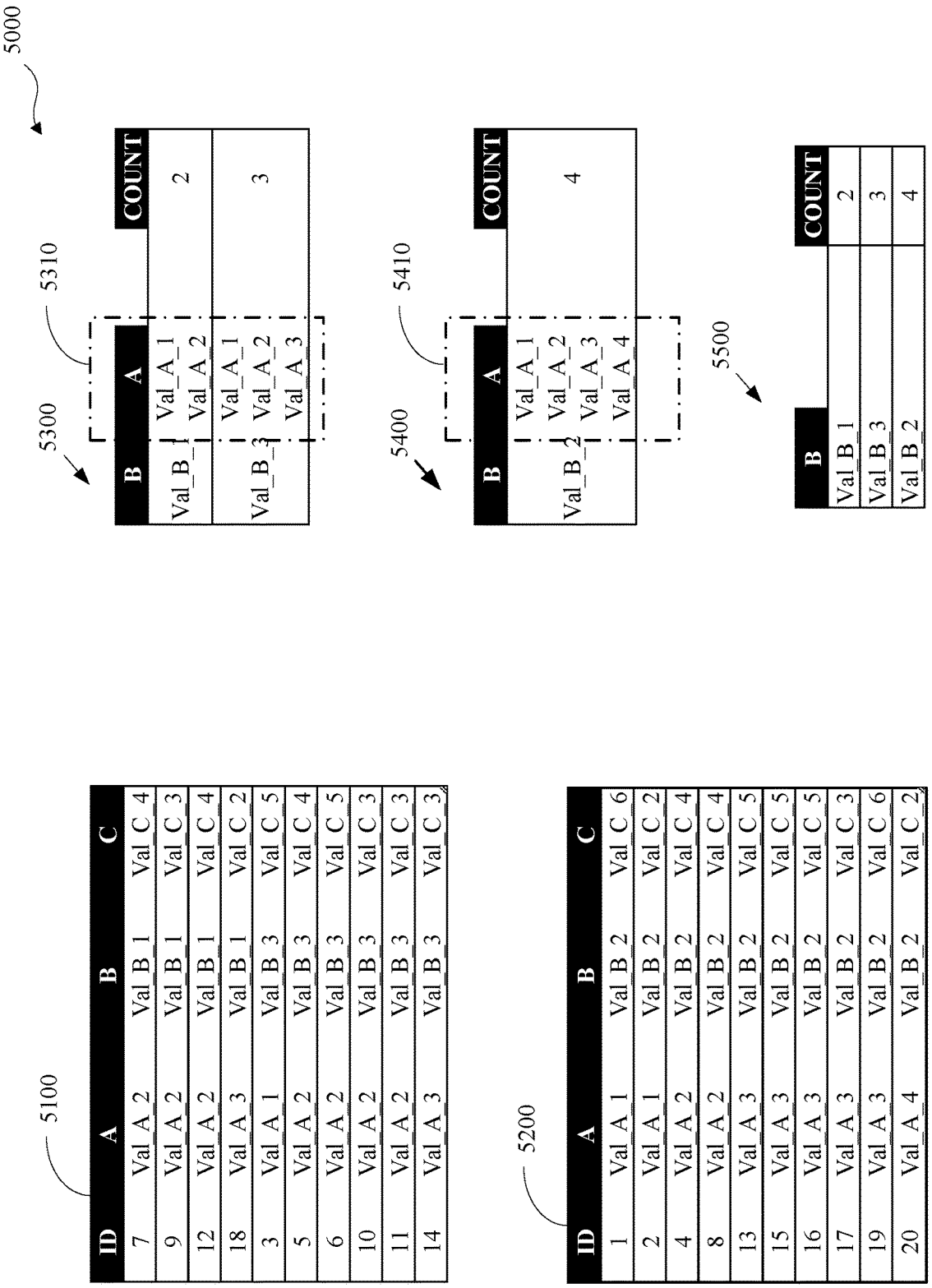
FIG. 5 illustrates an example of data partitioning according to a grouping column of a data-query for aggregations together with groupings of data in a distributed database according to implementations of this disclosure.

FIG. 5 illustrates an example 5000 of data partitioning according to a grouping column of a data-query for aggregations together with groupings of data in a distributed database according to implementations of this disclosure. In the example 5000, the table 4100 of FIG. 4 is sharded on column B, which is a grouping column of a data-query for simultaneous aggregations and groupings. For example, the table 4100 is sharded on the column B of data-query "select count (distinct A) from T group by B." The example 5000 includes two shards (i.e., a first shard 5100 and a second shard 5200). However, as already mentioned, many more shards are possible.

The sharding criteria of the example 5000 are such that values Val_B_1 and Val_B_3 of the column B are in the first shard 5100 and value Val_B_2 of the column B are in the second shard 5200. That is, rows of the table 4100 that include either of the values Val_B_1 or Val_B_3 are in the first shard 5100; and rows of the table 4100 that include the value Val_B_3 are in the second shard 5200.

Sharding according to the grouping column can mean that all rows having a particular value of the sharding column may be found in one and only one shard. For example, all rows of the table 4100 having Val_B_2 of the column B are in the second shard 5200 and no rows in the other shards (i.e., the first shard 5100) include a Val_B_2 value of B. As such, and as compared to the steps outlined with respect to FIG. 4, no duplication of data is possible and unique counts for each value of B can be computed at the database instances and no values of A need be transmitted from each database instance to the query coordinator.

As such, to compute a count of distinct values of A for each value of B, a count can be computed in parallel per shard across (e.g., by each of, at each of, etc.) the database instances that include the shards and the results transmitted to the query coordinator for concatenation. Thus, when a table is sharded on the grouping column, maximum parallelism can be achieved and a relatively small amount of network communication is required.

Results 5300 and results 5400 show the counts obtained from the first shard 5100 and the second shard 5200 respectively. It is noted that first unique values 5310 and second unique values 5410 are shown for completeness and are not transmitted to the query coordinator. The query coordinator can concatenate the received results 5300 and 5400 to obtain results 5500. The results 5500 includes the same information (e.g., the same counts) as the results 4600 of FIG. 4.

Figure 6:
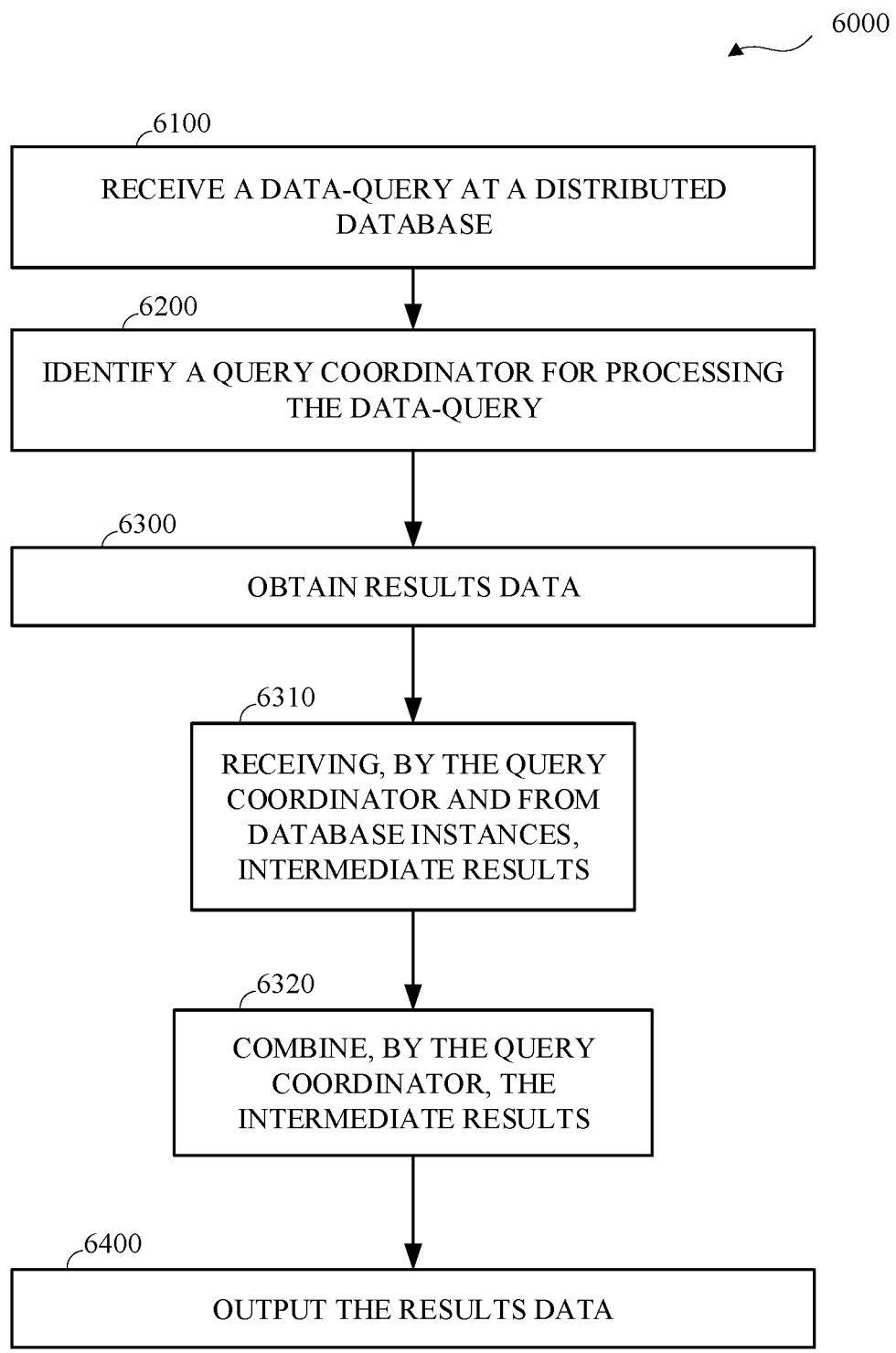
FIG. 6 is a flowchart of an example of querying a distributed database according to implementations of this disclosure.

FIG. 6 is a flowchart of an example 6000 of querying a distributed database according to implementations of this disclosure.

The example 6000 may be implemented by a distributed database, such as the distributed in-memory database 3300 of FIG. 3. For example, the example 6000 may be implemented by a database instance, such as in-memory database instance as described herein. The example 6000 can be implemented by an internal database analysis portion, such as the internal database analysis portion 2200 of FIG. 2, or an aspect thereof, such as one or more of the servers 2220, 2240, 2260, and 2280. For example, the example 6000 may be implemented using the computing device 1000 of FIG. 1. The example 6000 can be implemented fully or partially by a database instance that can be a query coordinator.

At 6100, the example 6000 receives a data-query at the distributed database. The data-query includes an aggregation clause on at least the first column of the table and a grouping clause on least the second column of the table. The distributed database includes a table that includes a first column and a second column. The table can be partitioned into shards according to a sharding criterion and the shards can be distributed to one or more database instances of the distributed database. In an example, a first database instance includes the first shard and a second database instance includes the second shard.

A first shard includes one or more rows of the table having a first value of the first column and a second shard omits a row of the table having the first value of the first column. In an example, the sharding criterion can include only the first column of the table, as illustrated with respect to FIG. 7A. In an example, the sharding criterion includes sharding on the first column (i.e., the aggregation column) followed by sharding on the second column (i.e., the grouping column), as illustrated with respect to FIG. 7B. Other sharding criteria are possible.

The query pseudo-code "select count (distinct A) from T group by B" is again used for illustration purposes. However, the disclosure is not so limited and other data-queries or syntaxes are possible.

At 6200, the example 6000 identifies (e.g., selects, designates, etc.) a query coordinator for processing the data-query. In an example, the query coordinator can be selected from one of the database instances on a round robin basis. In an example, a query coordinator can be identified. The query coordinator can be identified (e.g., selected, etc.) based on a current load of the database instances. Other ways of identifying the query coordinator are possible. As mentioned, the query coordinator can generate a query plan for executing the data-query. The query plan can include execution instructions. At least some of the execution instructions may be executed by the query coordinator. At least some of the execution instructions may be executed by one or more other database instances of the distributed database. For example, the query coordinator can forward at least some of the execution instructions to other database instances to obtain from at least some of the database instances intermediate (e.g., partial) results.

At 6300, the example 6000 obtains results data responsive to the data-query.

Figure 7A:
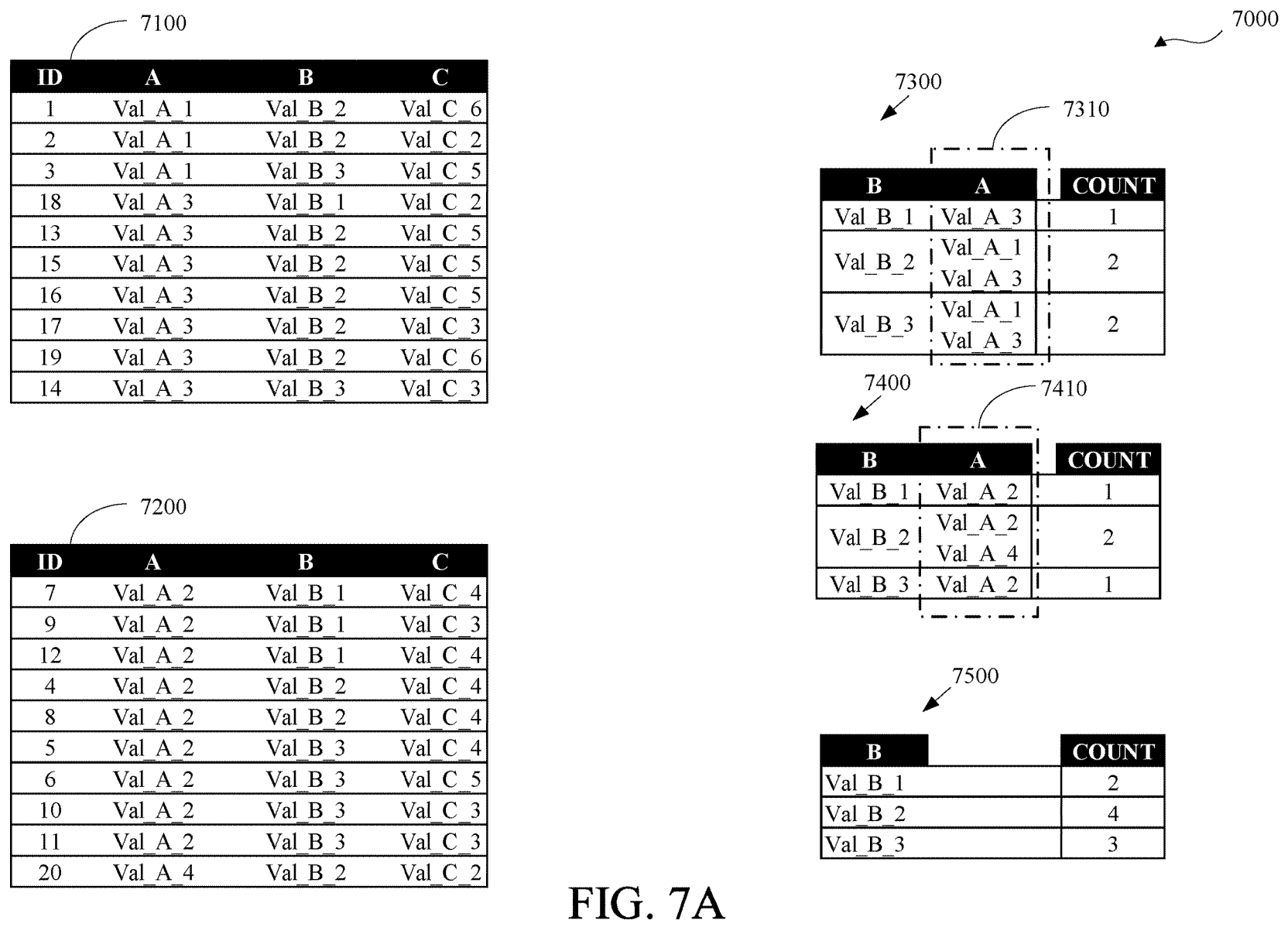
Figure 7B:
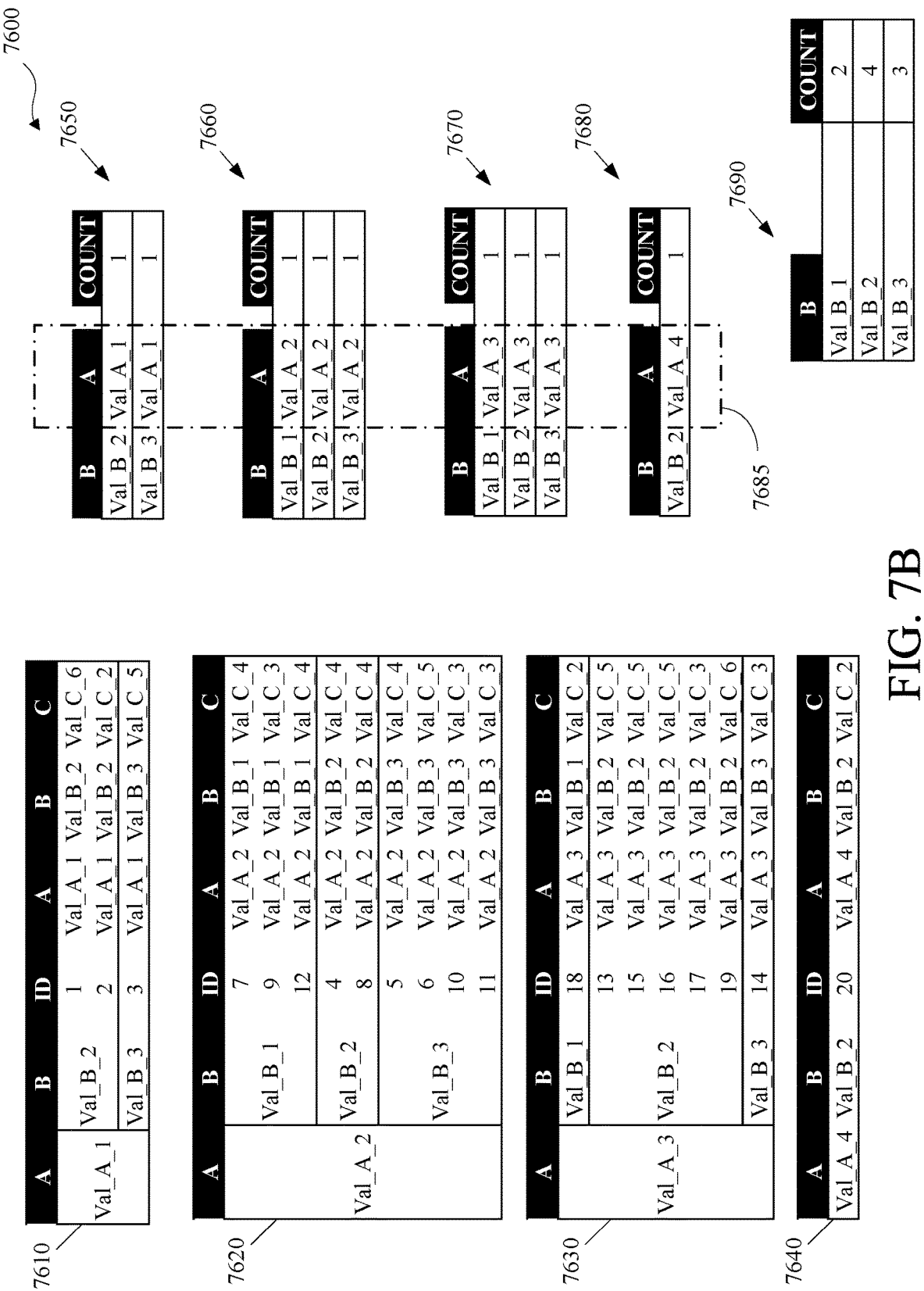
FIG. 7B illustrates an example of data partitioning according to an aggregation column and a grouping column of a data-query for aggregations together with groupings of data in a distributed database according to implementations of this disclosure.

Obtaining the results data is described with respect to FIG. 7A and FIG. 7B. Obtaining the results can include the steps 6310-6320.

FIG. 7A illustrates an example 7000 of data partitioning according to an aggregation column of a data-query for aggregations together with groupings of data in a distributed database according to implementations of this disclosure. In the example 7000, the table 4100 of FIG. 4 is sharded using a sharding criterion according to the aggregation column of the data-query. That is, the table 4100 is sharded on column A. Two shards are shown: a first shard 7100 and a second shard 7200. The sharding criteria is such that rows of the table 4100 having the values Val_A_1 and Val_A_3 for column A are in the first shard 7100, and rows of the table 4100 having the values Val_A_2 and Val_A_4 for column A are in the second shard 7200.

FIG. 7B illustrates an example 7600 of data partitioning according to an aggregation column and a grouping column of a data-query for aggregations together with groupings of data in a distributed database according to implementations of this disclosure. In the example 7600, the table 4100 of FIG. 4 is sharded using a sharding criterion according to the aggregation column (e.g., column A) of the data-query followed by the grouping column (grouping B) of the data-query. In the example, 7600, the table 4100 is partitioned into four shards: shards 7610-7640, which illustrate how the rows of the table 4100 are distributed amongst the shards 7610-7640 based on the values in the columns A and B. No value of the column A is in more than one shard. Any particular value of the column A can be in only one shard.

At 6310 of obtaining the results data, the example 6000 receives, from at least a subset of the database instances of the distributed database intermediate results data responsive to at least a portion of the data-query. That is, the example 6000 receives respective aggregations of values of the first column for each value of the second column. Each aggregation of values can be received by the query coordinator from a respective database instance to which a shard of the table is distributed.

Receiving the intermediate results data can include receiving, from a first database instance for the first shard, first aggregation values indicating, on a per-group basis in accordance with the grouping clause, a respective aggregation value of distinct values of the first column in accordance with the aggregation clause; and receiving, from a second database instance for a second shard, second aggregation values indicating, on a per-group basis in accordance with the grouping clause, a respective aggregation value of distinct values of the first column in accordance with the aggregation clause. In an example, the aggregation values are cardinality values (i.e., counts of the distinct values).

Referring to the example 7000 of FIG. 7A, using first execution instruction received from the query coordinator, a first database instance obtains results 7300 from the first shard 7100; and, using second execution instructions received from the query coordinator, a second database instance obtains results 7400 from the second shard 7200. The results 7300 and 7400 count, for each value of the grouping column (i.e., column B) the number of distinct values of the aggregation column (i.e., column A). From the first database instance, the query coordinator may receive, for example, the aggregation values (e.g., the cardinalities) 1, 2, and 2 for Val_B_1, Val_B_2, and Val_B_3 of B, respectively; and from the second database instance, the query coordinator may receive, for example, aggregation values (e.g., the cardinalities) 1, 2, and 1 for Val_B_1, Val_B_2, and Val_B_3 of B, respectively. It is noted that first unique values 7310 and second unique values 7410 are shown for completeness and are not transmitted to the query coordinator.

Referring to the example 7600 of FIG. 7B, results 7650-7680 are obtained at database instances from the shards 7610-7640, respectively, based on respective execution instructions received from the query coordinator. Each of the results 7650-7680 counts, for each value of the grouping column (e.g., column B) the number of distinct values of the aggregation column (e.g., column A). The query coordinator receives, for example, aggregation values (e.g., the cardinalities) 1 and 1 for Val_B_2 and Val_B_3, respectively corresponding to the result 7650; aggregation values (e.g., the cardinalities) 1, 1, and 1 for Val_B_1, Val_B_2, and Val_B_3 of B corresponding to the result 7660; and so on. It is noted that unique values 7685 are shown for completeness and are not transmitted to the query coordinator.

At 6320 of obtaining the results data, the example 6000 combines the intermediate results to obtain the results data. That is, the example 6000 combines the respective aggregations of the values of the first column to obtain the results data where the results data being an aggregation of the values of the first column for each value of the second column.

At 6400, the example 6000 outputs the results data. In an example, the results data can be used to obtain visualization data or some other output as described herein.

In an example, the example 6000 can include receiving, at a low-latency data analysis system that includes the distributed database, data expressing a usage intent, in response to user input associated with a user; and receiving the data-query can include obtaining the data-query in response to receiving the data expressing the usage intent, and outputting the results data can include outputting at least a portion of the results data for presentation to the user.

As already described, the aggregation clause can include or can be a counting (i.e., determining a cardinality) of the distinct values of the first column. As such, combining the respective aggregations can include querying at least some of the shards for respective shard-specific distinct values of the first column (e.g., the values of A that are in a the shard) grouped by shard-specific values of the second column (e.g., the values of B that are in a the shard), and, for each shard-specific value, of the second column, obtaining a respective count of the respective shard-specific distinct values.

In an example, combining the respective aggregations of the values of the first column to obtain the results data can include summing, for each value of the second column, the respective aggregations of the values of the first column. Each aggregation of the values of the first column is a count of the distinct values of the first column. For example, and referring to FIG. 7A and FIG. 7B, the example 6000 obtains the result data 7500 and result data 7690, respectively.

While the query pseudo-code "select count (distinct A) from T group by B" is used throughout for illustration purposes, it is to be understood that other types of queries involving aggregation clauses and grouping clauses are also contemplated. For example, queries that include a "minimum" or a "maximum" aggregation clause (e.g., function) are also possible. The minimum function is an aggregate function (e.g., clause) that finds the minimum value in a set, such as "select min (A) from T group by B." The maximum function is an aggregate function (e.g., clause) that finds the maximum value in a set, such as "select max (A) from T group by B." As such, instead of counts, the query coordinator can receive the minimum (or maximum) value for each of the values of grouping column and, instead of summing, the query coordinator obtains a minimum (or maximum) of all the received minimums (or maximums).

In an example, the aggregation clause can additionally include counting (i.e., determining a cardinality) of distinct values of a third column of the table that is not included in the sharding criteria of the table. That is, the aggregation clause can include an additional counting clause of distinct values of a third column of the table where the third column of the table is not part of the sharding criteria. For example, the data-query can be of the form "select count (distinct A), count (distinct C) from T group by B," where "count (distinct C)" can be the additional counting clause and the table T is not sharded on the column C. In such a case, a respective aggregation of the respective aggregations of the values of the first column for the each value of the second column further includes the distinct values of the third column for the each value of the second column. That is, the distinct values of the third column can be included in the aggregations received from the database instances so that the query coordinator can union all the distinct values to obtain the counts (i.e., cardinalities).

In an example, and as mentioned above, the data-query can include a sampling clause. When a sampling clause is present, the example 6000 obtains aggregations (e.g., unique counts) for only sampled groups (i.e., not for all groups) of the grouping column. In an example, the sampling clause can be the "limit" clause. For example, the data-query can include "select count (distinct A) from T group by B limit 10," which returns distinct counts for only 10 values of the column B). Other sampling clauses are possible. Any clause that performs filtering on the second column may be considered to be a sampling clause. The sampling clause can be a combination of clauses that result in computing unique aggregations for (i.e., returning results data for) a subset of the groups of the second column.

When data are sharded by a first column (e.g., column A), the same values of A may be in only one shard. The number of distinct elements of the first column can be computed for each shard for each value of the second column (e.g., column B). The count can be transmitted for each value of the second column to one or more database instances, such as a query coordinator. The counts can then be summed from different database instances for each value of the second column.

Figure 8:
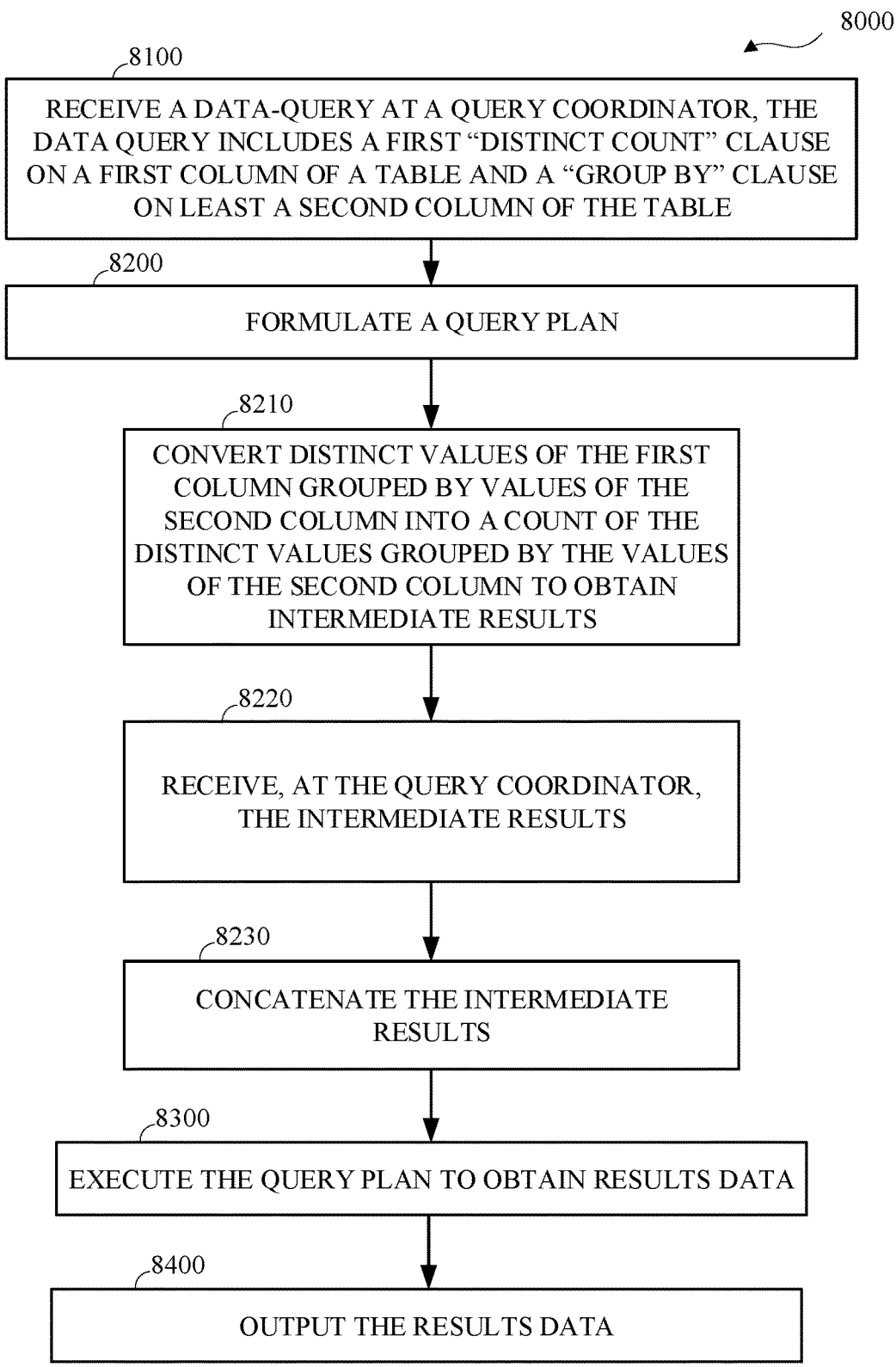
FIG. 8 is a flowchart of an example of query planning in a distributed database according to implementations of this disclosure.

FIG. 8 is a flowchart of an example 8000 of query planning in a distributed database according to implementations of this disclosure. The distributed database includes a table that is partitioned into shards according to a sharding criterion. The shards can be distributed to database instances of the distributed database. The example 8000 can be used to derive and execute a query plan for a data-query that includes a first "distinct count" clause on a first column of the table and a "group by" clause on least a second column of the table. In an example, the data-query can include a sampling clause.

A "distinct count" clause in this context broadly means any query clause or function whereby the specific values of the aggregation column in the shards are not required by the query coordinator to obtain results data. For example, a "distinct count" clause encompasses a distinct count clause, a minimum function clause, or a maximum function clause as described herein.

The example 8000 may be implemented by a distributed database, such as the distributed in-memory database 3300 of FIG. 3. For example, the example 8000 may be implemented by a database instance, such as in-memory database instance as described herein. The example 8000 can be implemented by an internal database analysis portion, such as the internal database analysis portion 2200 of FIG. 2, or an aspect thereof, such as one or more of the servers 2220, 2240, 2260, and 2280. For example, the example 8000 may be implemented using the computing device 1000 of FIG. 1. The example 8000 can be implemented fully or partially by a query coordinator. The example 8000 can be implemented fully or partially by a database instance that is not a query coordinator.

At 8100, the example 8000 receives a data-query at a query coordinator. The query coordinator can be identified as described herein. The data-query includes a first "distinct count" clause on a first column of the table and a "group by" clause on least a second column of the table. The table is partitioned into the shards according to a sharding criterion;

At 8200, the example 8000 formulates a query plan. The query plan can be formulated based on a determination that the sharding criterion includes the first column. In an example, the table can be sharded on the first column. In an example, the table can be sharded on the first column and the second column. Formulating the query plan can include steps 8210-8230. The query plan can be formulated by the query coordinator. The query plan is such that distinct values of the first column are not transmitted from at least some of the database instances to the query coordinator.

Figure 9A:
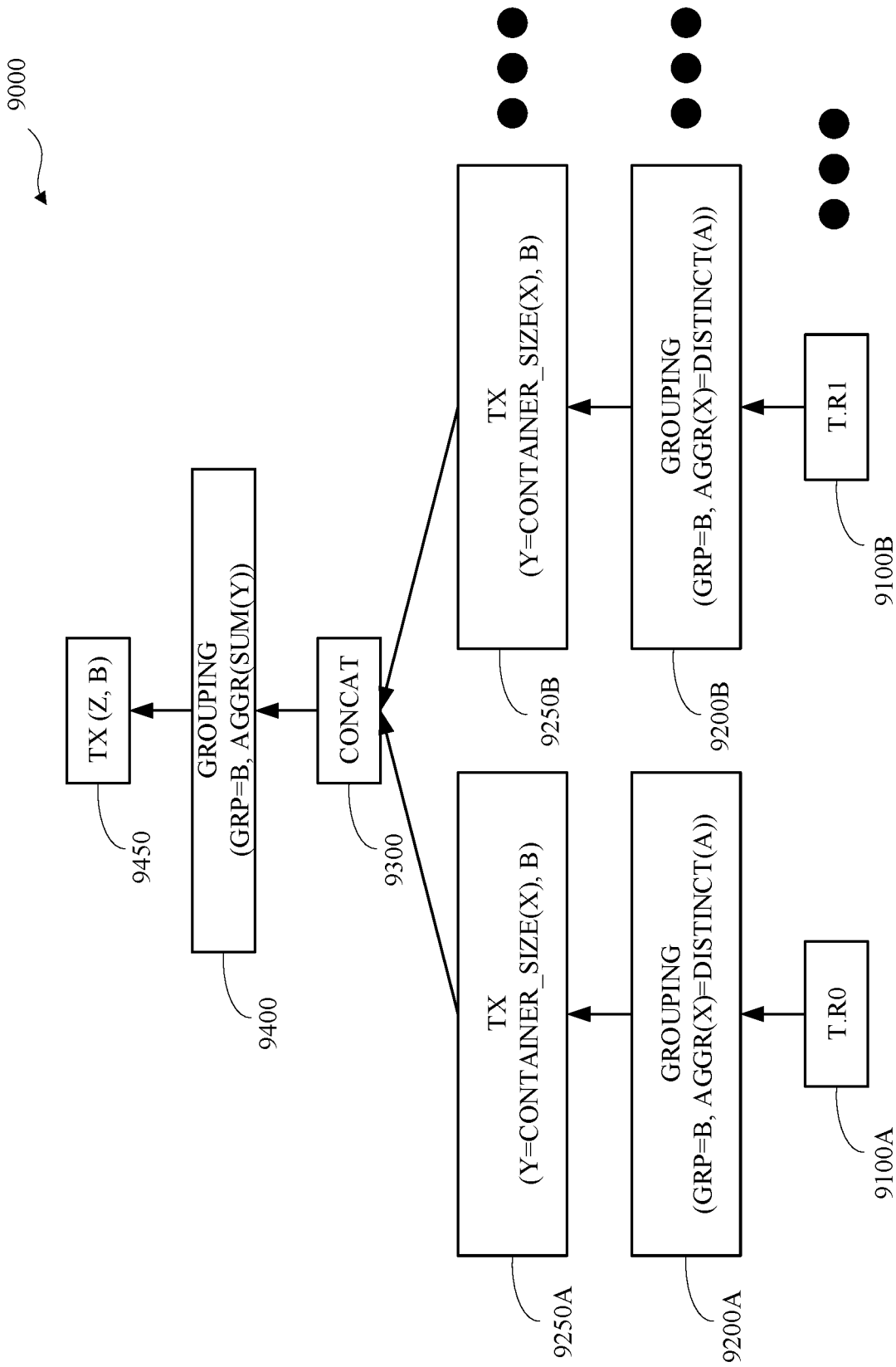
FIG. 9A is a diagram of an example of a query plan for a data-query for aggregations together with groupings of data in a distributed database according to implementations of this disclosure.
Figure 9B:
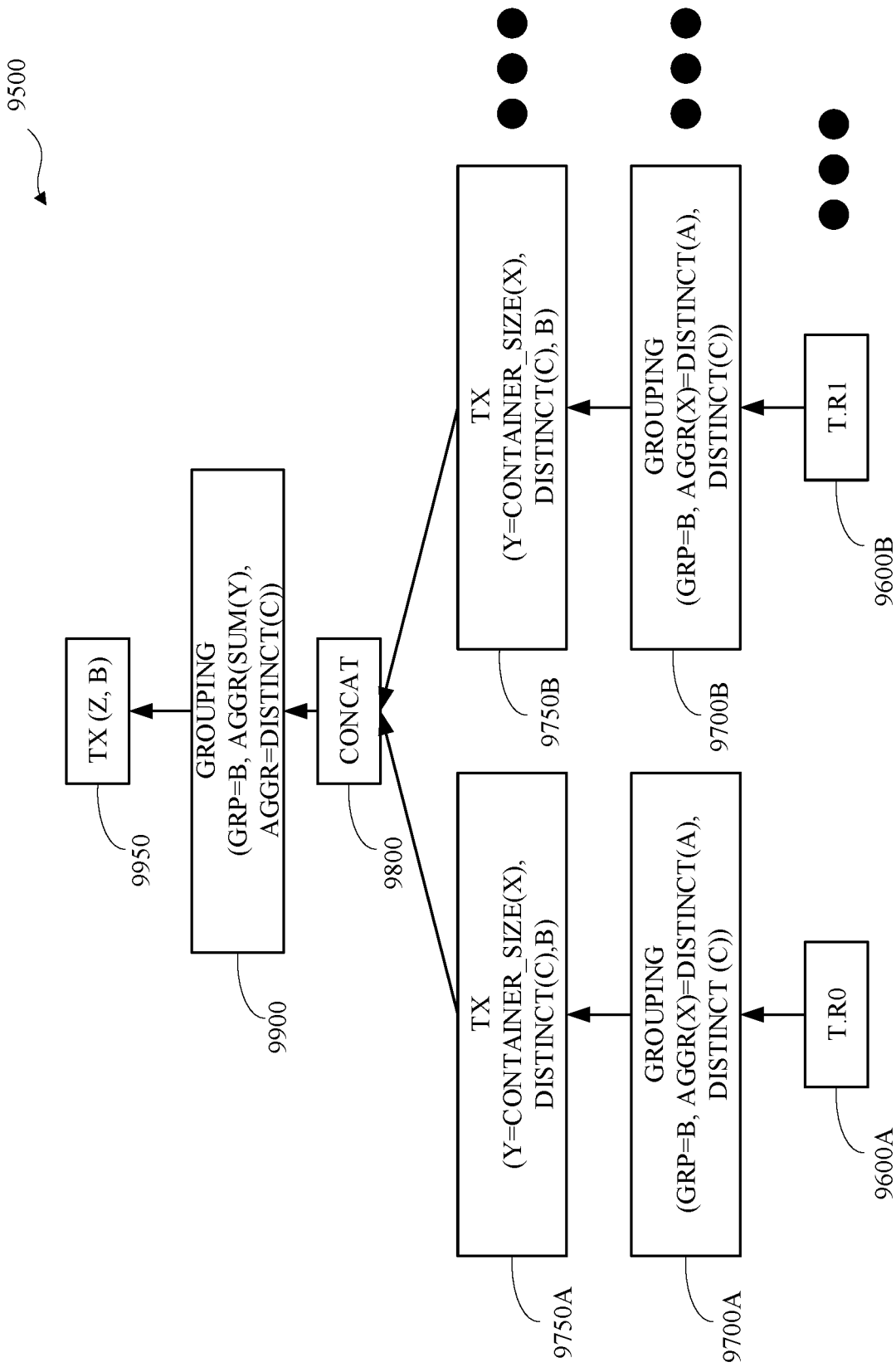
FIG. 9B is a flow diagram of an example of a query plan for a data-query for aggregations together with groupings of data in a distributed database according to implementations of this disclosure.

For illustration purposes, formulating the query plan is described with reference to FIG. 9A and FIG. 9B. FIG. 9A is a diagram of an example of a query plan 9000 for a data-query for aggregations together with groupings of data in a distributed database according to implementations of this disclosure. FIG. 9B is a diagram of an example of a query plan 9500 for a data-query for aggregations together with groupings of data in a distributed database according to implementations of this disclosure. The query plan of the query plan 9500 can be used when the data-query includes a second "distinct count" clause on third column and the sharding criterion does not include the third column.

The query plan 9000 of FIG. 9A includes that the table T is partitioned into at least two shards: shards 9100A (i.e., region T.R0) and 9100B (i.e., region T.R1); and the query plan 9500 of FIG. 9B includes that the table T is partitioned into at least two shards: shards 9600A (i.e., region T.R0) and 9600B (i.e., region T.R1).

At 8210, the query plan includes instructions for converting, at at least some of the database instances, distinct values of the first column grouped by values of the second column into a count of the distinct values grouped by the values of the second column to obtain respective intermediate results. The instructions for converting are transmitted to the at least some of the database instances for execution. The at least some of the database instances can include the query coordinator.

In the query plan 9000, the query plan includes that, at at least some of the database instances, a grouping 9200 is to be performed whereby the shard is queried to obtain the distinct values of the first column (e.g., column A) grouped by the second column (e.g., column B). Each group of distinct values can be stored in a respective container X. The query plan includes a transformation 9250 that converts (e.g., causes the database instance to convert) the respective containers X into the respective counts (e.g., Y=CONTAINER SIZE(X)), which are the sizes of (i.e., the number of elements in) the respective containers X.

In the query plan 9500, the query plan includes that, at at least some of the database instances, a grouping 9700 is to be performed whereby the shard is queried to obtain the distinct values of the first column (e.g., column A) and the third column (e.g., column C) grouped by the second column. Each group of distinct values of the first column are to be stored in a respective container X. The query plan includes a transformation 9750 that converts the respective containers X into the respective counts (e.g., Y=CONTAINER SIZE(X)), which are the sizes of (i.e., the number of elements in) the respective containers X. It is noted that the transformation 9750 retains the distinct values of the third column (e.g., DISTINCT(C)).

At 8220, the query plan includes instructions for receiving, at the query coordinator, the respective intermediate results from at least a subset of the at least some of the database instances. A shard may not include values of the second column. As such, no transformation may be received corresponding to the shard. Alternatively or equivalently, an empty transformation, a null transformation, or an indication thereof may be received at the query coordinator.

In the query plan 9000, the query coordinator concatenates (e.g., includes execution instructions to concatenate) the received respective transformations at a concatenation 9300. In the query plan 9500, the query coordinator concatenates (e.g., performs instructions to concatenate) the received respective transformations at a concatenation 9800.

At 8230, the query plan includes instructions for concatenating the respective intermediate results using a summing operation to obtain the "distinct count" of the first column grouped by the second column. That is, the execution plan includes execution instructions for the summing operation. In the query plan 9000, a grouping 9400 can be performed by the query coordinator by adding (e.g., SUM(Y)), for each value of the second column the received counts. The results data are obtained at a transformation 9450. The transformation 9450 indicates that for each value of B, a respective count Z is obtained. As can be appreciated, the aggregation operation used depends on the aggregation clause. As such, wherein the SUM(Y) operation is used in the case that the aggregation clause is a "count (distinct A)," a MIN(Y) or MAX(Y) can be use when the aggregation clause is "min (A)" or "max(A)," respectively.

In the query plan 9500, a grouping 9900 can be performed by the query coordinator by adding (e.g., SUM(Y)), for each value of the second column the received counts. As mentioned, the aggregation operation used depends on the aggregation clause. The query coordinator can also obtain, for each value of the second column, all the distinct values of the third column by aggregating (e.g., using a union operation as described above) grouped by the second column. The results data are obtained at a transformation 9950. As such, the query plan can include respective instructions for including, at the least some of the database instances, respective distinct values of the third column grouped by the first column, and instructions for performing, for each distinct value of first column, a union aggregation of all the respective distinct values of the third column grouped by the first column received from the database instances.

At 8300, the example 8000 executes the query plan to obtain the results data. Executing the query plan includes transmitting instructions of the query plan to database instances for execution. At 8400, the example 8000 includes outputting the results data.

In an example, the example 8000 can include determining whether the table is sharded on the grouping column first. If the table is sharded on the grouping column, then the data-query can be executed as described with respect to FIG. 5. If the table is not sharded on the grouping column, the example 8000 can combine one aggregate clause with the grouping clause to determine whether the combination can meet the sharding criteria.

Figure 10:
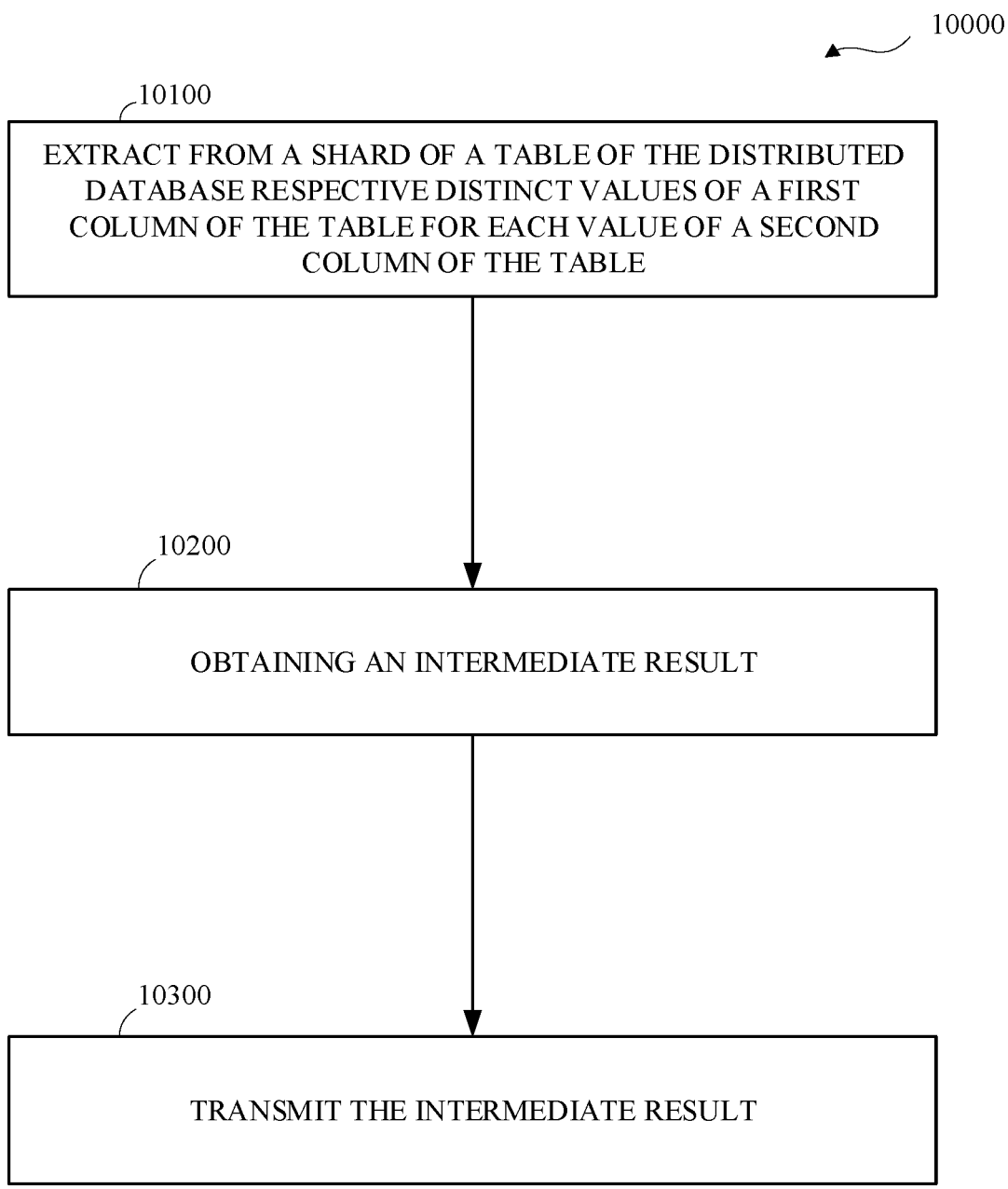
FIG. 10 is a flowchart of an example of querying a distributed database according to implementations of this disclosure.

FIG. 10 is a flowchart of an example 10000 of querying a distributed database according to implementations of this disclosure. The example 10000 can be implemented by a database instance to query a shard of a table of a distributed database in response to receiving a data-query. The database instance can query the shard in response to execution instructions of a query plan received from a query coordinator.

The table includes a first column that is an aggregation column of the data-query. The table includes a second column that is a grouping column of the data-query. In an example, the aggregation clause of the data-query includes counting (i.e., determining the cardinality of) distinct values of the first column for each value of the second column.

The sharding of the table is such that any one value of the first column is in only one shard. That is, values of the first column in the shard according to the sharding criterion are not in any other shard of the table.

At 10100, the example 10000 extracts, from the shard of the table of the distributed database, respective distinct values of a first column of the table for each value of a second column of the table. In an example, the respective distinct values of a first column can be extracted as described with respect to 9200 of FIG. 9A.

At 10200, the example 10000 obtains an intermediate result by determining a respective number of the respective distinct values for the each value of the second column of the table. In an example, the example 10000 obtains the intermediate result as described with respect to 9250 of FIG. 9A.

At 10300, the example 10000 transmits the intermediate result to a query coordinator. As described above, the query coordinator can combine several partial results from more than one database instance to obtain results data.

In an example, the data-query can further include an aggregation clause on a third column where the sharding criterion omits (e.g., does not include) the third column. That is, the table is not sharded on the third column. In an example, the intermediate results further include distinct values of the third column grouped by the distinct values for the each value of the second column of the table.

While aggregation operations in a distributed database are described with respect to a distributed database, a table of a database, and columns of the table, it can be appreciated that the techniques described herein can be used with any data that is partitioned such that processing can be performed, such as in parallel, one a partition basis and each partition includes unique values of a first aspect (e.g., property, attribute, etc.) of the data and the processing includes obtaining aggregations (e.g., distinct counts) of the first aspect grouped by a second aspect of the data.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine," "identify," "obtain," and "form" or any variations thereof, includes selecting, ascertaining, computing, looking up, receiving, determining, establishing, obtaining, or otherwise identifying or determining in any manner whatsoever using one or more of the devices and methods shown and described herein.

As used herein, the term "computing device" includes any unit, or combination of units, capable of performing any method, or any portion or portions thereof, disclosed herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for querying a distributed database, comprising:
   receiving a data-query at the distributed database, wherein
     the distributed database comprises a table,
     the table comprises a first column and a second column,
     the table is partitioned into shards according to a sharding criterion, wherein the sharding criterion indicates the first column, such that a first shard includes one or more rows of the table having a first value of the first column and a second shard omits a row of the table having the first value of the first column,
     the shards are distributed to database instances of the distributed database, and
     the data-query comprises an aggregation clause on the first column and a grouping clause on the second column;
   identifying a query coordinator for processing the data-query;
   obtaining results data responsive to the data-query, wherein obtaining the results data comprises:
     receiving, by the query coordinator and from at least a subset of the database instances of the distributed database, intermediate results data responsive to at least a portion of the data-query, wherein receiving the intermediate results data includes:
       receiving, from a first database instance for a first shard, first aggregation values indicating, on a per-group basis in accordance with the grouping clause, a respective aggregation value of distinct values of the first column in accordance with the aggregation clause, and
       receiving, from a second database instance for a second shard, second aggregation values indicating, on a per-group basis in accordance with the grouping clause, a respective aggregation value of distinct values of the first column in accordance with the aggregation clause; and
     combining, by the query coordinator, the intermediate results to obtain the results data; and
   outputting the results data.

2. The method of claim 1, wherein the aggregation clause comprises determining a cardinality of distinct values of the first column.

3. The method of claim 2, wherein combining, by the query coordinator, the intermediate results to obtain the results data comprises:
   querying at least some of the shards for respective shard-specific distinct values of the first column grouped by shard-specific values of the second column; and
   for each shard-specific value of the second column, obtaining a respective count of the respective shard-specific distinct values.

4. The method of claim 1, further comprising:
   receiving, at a low-latency data analysis system that includes the distributed database, data expressing a usage intent, in response to user input associated with a user,
     wherein receiving the data-query comprises: obtaining the data-query in response to receiving the data expressing the usage intent; and
     wherein outputting the results data comprises: outputting at least a portion of the results data for presentation to the user.

5. The method of claim 1, wherein the sharding criterion consists of the first column of the table.

6. The method of claim 1, wherein the sharding criterion comprises the first column of the table and the second column of the table.

7. The method of claim 6, wherein the sharding criterion comprises sharding on the first column followed by sharding on the second column.

8. The method of claim 1, wherein the aggregation clause comprises at least one of a minimum clause or a maximum clause.

9. The method of claim 1,
   wherein the aggregation clause further comprises determining a cardinality of distinct values of a third column of the table,
   wherein the sharding criterion does not include the third column of the table, and
   wherein an intermediate result of the intermediate results further comprises distinct values of the third column for the each value of the second column.

10. The method of claim 1, wherein the data-query further comprises a sampling clause.

11. A device for querying a distributed database, comprising:
   a memory; and
   a processor, the processor configured to execute instructions stored in the memory to: receive a data-query at the distributed database, wherein
     the distributed database comprises a table,
     the table comprises a first column and a second column,
     the table is partitioned into shards according to a sharding criterion,
     wherein the sharding criterion indicates the first column, such that a first shard includes one or more rows of the table having a first value of the first column and a second shard omits a row of the table having the first value of the first column,
     the shards are distributed to database instances of the distributed database, and
     the data-query comprises an aggregation clause on the first column and a grouping clause on the second column;
   identify a query coordinator for processing the data-query;
   obtain results data responsive to the data-query, wherein to obtain the results data comprises to:
     receive, by the query coordinator and from at least a subset of the database instances of the distributed database, intermediate results data responsive to at least a portion of the data-query, wherein to receive the intermediate results data includes to:
  receive, from a first database instance for a first shard, first aggregation values indicating, on a per-group basis in accordance with the grouping clause, a respective aggregation value of distinct values of the first column in accordance with the aggregation clause, and
  receive, from a second database instance for a second shard, second aggregation values indicating, on a per-group basis in accordance with the grouping clause, a respective aggregation value of distinct values of the first column in accordance with the aggregation clause; and
  combine, by the query coordinator, the intermediate results to obtain the results data; and
output the results data.

12. The device of claim 11, wherein the aggregation clause comprises determining a cardinality of distinct values of the first column.

13. The device of claim 12, wherein to combine, by the query coordinator, the intermediate results to obtain the results data comprises to:
  query at least some of the shards for respective shard-specific distinct values of the first column grouped by shard-specific values of the second column; and
  for each shard-specific value of the second column, obtain a respective count of the respective shard-specific distinct values.

14. The device of claim 11, wherein the processor is further configured to execute instructions to:
  receive, at a low-latency data analysis system that includes the distributed database, data expressing a usage intent, in response to user input associated with a user,
    wherein to receive the data-query comprises to: obtain the data-query in response to receiving the data expressing the usage intent; and
    wherein to output the results data comprises to: output at least a portion of the results data for presentation to the user.

15. The device of claim 11, wherein the sharding criterion consists of the first column of the table.

16. The device of claim 11, wherein the sharding criterion comprises the first column of the table and the second column of the table.

17. The device of claim 16, wherein the sharding criterion comprises sharding on the first column followed by sharding on the second column.

18. The device of claim 11, wherein the aggregation clause comprises at least one of a minimum clause or a maximum clause.

19. The device of claim 11,
  wherein the aggregation clause further comprises determining a cardinality of distinct values of a third column of the table,
  wherein the sharding criterion does not include the third column of the table, and
  wherein an intermediate result of the intermediate results further comprises distinct values of the third column for the each value of the second column.

20. A non-transitory computer readable medium storing instructions operable to cause one or more processors to perform operations for querying a distributed database, comprising:
  receiving a data-query at the distributed database, wherein
    the distributed database comprises a table,
    the table comprises a first column and a second column,
    the table is partitioned into shards according to a sharding criterion, wherein the sharding criterion indicates the first column, such that a first shard includes one or more rows of the table having a first value of the first column and a second shard omits a row of the table having the first value of the first column,
    the shards are distributed to database instances of the distributed database, and
    the data-query comprises an aggregation clause on the first column and a grouping clause on the second column;
  identifying a query coordinator for processing the data-query;
  obtaining results data responsive to the data-query, wherein obtaining the results data comprises:
    receiving, by the query coordinator and from at least a subset of the database instances of the distributed database, intermediate results data responsive to at least a portion of the data-query, wherein receiving the intermediate results data includes:
      receiving, from a first database instance for a first shard, first aggregation values indicating, on a per-group basis in accordance with the grouping clause, a respective aggregation value of distinct values of the first column in accordance with the aggregation clause, and
      receiving, from a second database instance for a second shard, second aggregation values indicating, on a per-group basis in accordance with the grouping clause, a respective aggregation value of distinct values of the first column in accordance with the aggregation clause; and
    combining, by the query coordinator, the intermediate results to obtain the results data; and
  outputting the results data.

* * * * *